US012744718B2

(12) United States Patent
Yu et al.

(10) Patent No.: US 12,744,718 B2
(45) Date of Patent: Sep. 22, 2026

(54) PACKET LOSS RATE DETECTION METHOD, COMMUNICATION APPARATUS, AND COMMUNICATION SYSTEM

(71) Applicant: Huawei Technologies Co., Ltd., Shenzhen (CN)

(72) Inventors: Youyang Yu, Shanghai (CN); Shufeng Shi, Xi'an (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 18/363,295

(22) Filed: Aug. 1, 2023

(65) Prior Publication Data

US 2023/0379233 A1 Nov. 23, 2023

Related U.S. Application Data

(63) Continuation of application No. PCT/CN2022/072590, filed on Jan. 18, 2022.

(30) Foreign Application Priority Data

Feb. 3, 2021 (CN) ........................ 202110152262.X

(51) Int. Cl.

*H04L 43/0829* (2022.01)
*H04L 43/0882* (2022.01)
*H04L 47/125* (2022.01)

(52) U.S. Cl.

CPC ...... *H04L 43/0829* (2013.01); *H04L 43/0882* (2013.01); *H04L 47/125* (2013.01)

(58) Field of Classification Search

CPC ............. H04L 43/0829; H04L 43/0882; H04L 47/125; H04L 41/0894; H04L 43/06; H04L 43/16

See application file for complete search history.

(56) References Cited

U.S. PATENT DOCUMENTS

2009/0016233 A1 1/2009 Lu
2011/0188380 A1 8/2011 Song et al.

(Continued)

FOREIGN PATENT DOCUMENTS

CN 101729197 A 6/2010
CN 102217236 A * 10/2011 ......... H04L 43/0829

(Continued)

OTHER PUBLICATIONS

C. Wang, C. Chen, Q. Pei and L. Wang, "IDDS: An ICN based Data Dissemination Scheme for Vehicular Networks," ICC 2020—2020 IEEE International Conference on Communications (ICC), Dublin, Ireland, 2020, pp. 1-7 (Year: 2020).*

(Continued)

*Primary Examiner* — Messeret F Gebre
(74) *Attorney, Agent, or Firm* — Conley Rose, P.C.

(57) ABSTRACT

In a packet loss rate detection method, a session management network element determines that link status detection needs to be performed on a link on which a service flow is located; and the session management network element sends a link status detection indication to a first device and/or a second device, where the link status detection indication is for enabling a link status detection function, and the link status detection function includes a packet loss rate detection function.

20 Claims, 9 Drawing Sheets

(56) References Cited

U.S. PATENT DOCUMENTS

| | | | | |
|---|---|---|---|---|
| 2015/0200828 | A1 | 7/2015 | Liu et al. | |
| 2019/0253917 | A1* | 8/2019 | Dao | H04W 76/27 |
| 2020/0367110 | A1 | 11/2020 | Sun | |
| 2020/0413466 | A1 | 12/2020 | Yu | |
| 2021/0119896 | A1 | 4/2021 | Wu et al. | |
| 2021/0168079 | A1 | 6/2021 | Yu | |
| 2021/0234929 | A1 | 7/2021 | Zhao et al. | |

FOREIGN PATENT DOCUMENTS

| | | | | |
|---|---|---|---|---|
| CN | 110831033 | A | 2/2020 | |
| CN | 110831070 | A | 2/2020 | |
| CN | 110943964 | A | 3/2020 | |
| CN | 111756588 | A | 10/2020 | |
| CN | 116097681 | A * | 5/2023 | H04W 76/16 |
| JP | 2006287284 | A | 10/2006 | |
| WO | WO-2019149080 | A1 * | 8/2019 | H04L 41/5009 |
| WO | 2019192528 | A1 | 10/2019 | |

OTHER PUBLICATIONS

E. Pencheva, I. Atanasov, V. Vladislavov and V. Trifonov, "Packet Data Session Management as a Service," 2019 International Symposium on Networks, Computers and Communications (ISNCC), Istanbul, Turkey, 2019, pp. 1-6, (Year: 2019).*

Xiao Ziyu, "5G network application scenarios and planning and design elements," Telecommunications Engineering Technology and Standardization No. 7, 2018, Jul. 11, 2018, with the English Abstract, 5 pages.

LG Electronics, et al., "KI #1, Solution #3: Update to consider impacts on QoS framework," 3GPP TSG SA WG2 #142e, 3GPP, Nov. 20, 2020, S2-2009403, 6 pages.

"3rd Generation Partnership Project; Technical Specification Group Services and System Aspects; Study on Access Traffic Steering, Switch and Splitting support in the 5G system architecture Phase 2 (Release 17)," 3GPP Draft; 23.700-93 V1.2.0, Technical Report, Nov. 30, 2020, XP051963939, 101 pages.

3rd Generation Partnership Project; Technical Specification Group Services and System Aspects; System architecture for the 5G System (5GS); Stage 2 (Release 15), 3GPP TS 23.501 V15.12.0, Dec. 2020, total: 250 pages.

3rd Generation Partnership Project; Technical Specification Group Core Network and Terminals; Interface between the Control Plane and the User Plane Nodes; Stage 3 (Release 16), 3GPP TS 29.244 V16.6.0, Dec. 2020, total: 318 pages.

* cited by examiner

PACKET LOSS RATE DETECTION METHOD, COMMUNICATION APPARATUS, AND COMMUNICATION SYSTEM

CROSS-REFERENCE TO RELATED APPLICATIONS

This is a continuation of Int'l Patent App. No. PCT/CN2022/072590, filed on Jan. 18, 2022, which claims priority to Chinese Patent App. No. 202110152262.X, filed on Feb. 3, 2021, both of which are incorporated by reference.

FIELD

This disclosure relates to the field of communication technologies, and in particular, to a packet loss rate detection method, a communication apparatus, and a communication system.

BACKGROUND

When service data packets are sent between communication devices, the service data packets may be lost due to reasons such as a link abnormality. For example, when a first device sends service data packets to a second device, the service data packets may be lost.

How to quickly and accurately detect a packet loss rate of service data packets on a link needs to be resolved currently.

SUMMARY

This disclosure provides a packet loss rate detection method, a communication apparatus, and a communication system, to quickly and accurately detect a packet loss rate of service data packets on a link.

According to a first aspect, an embodiment provides a packet loss rate detection method. The method includes: A session management network element determines that link status detection needs to be performed on a link on which a service flow is located; and the session management network element sends a link status detection indication to a first device and/or a second device, where the link status detection indication is for enabling a link status detection function, and the link status detection function includes a packet loss rate detection function.

Based on the foregoing solution, the session management network element may send the link status detection indication to the first device and/or the second device, to enable a link status detection function of the first device and/or the second device. Therefore, the first device and/or the second device may quickly and accurately detect a packet loss rate of service data packets on the link based on the enabled link status detection function.

In a possible implementation method, the session management network element sends a counting indication to the second device, where the counting indication indicates the second device to count a quantity of service data packets sent by the first device to the second device on the link; or the counting indication indicates the second device to calculate, when receiving link status detection information, a quantity of service data packets received on the link, and send the quantity of the service data packets received on the link to the first device.

Based on the foregoing solution, the session management network element sends the counting indication to the second device, so that the second device may accurately count the received service data packets, thereby helping improve accuracy of calculating a packet loss rate.

In a possible implementation method, the session management network element sends a packet loss rate detection indication to the second device, where the packet loss rate detection indication indicates the second device to calculate a packet loss rate of service data packets when receiving link status detection information; or the packet loss rate detection indication indicates the second device to calculate a quantity of service data packets received on the link when receiving link status detection information, and calculate a packet loss rate of the service data packets by using the quantity of the service data packets received on the link.

In a possible implementation method, the session management network element sends a counting indication to the first device, where the counting indication indicates the first device to count a quantity of service data packets sent by the first device to the second device on the link.

Based on the foregoing solution, the session management network element sends the counting indication to the first device, so that the first device may accurately count the sent service data packets, thereby helping improve accuracy of calculating a packet loss rate.

In a possible implementation method, the session management network element sends a packet loss rate detection indication to the first device, where the packet loss rate detection indication indicates the first device to calculate, when receiving, from the second device, a quantity of received service data packets that is counted by the second device, a packet loss rate of the service data packets.

In a possible implementation method, the session management network element sends a link status reporting indication to the first device and/or the second device, where the link status reporting indication indicates to report the packet loss rate of the service data packets; or the session management network element sends a link status reporting frequency to the first device and/or the second device, where the link status reporting frequency indicates a frequency of reporting the packet loss rate of the service data packets; or the session management network element sends a link status reporting cycle to the first device and/or the second device, where the link status reporting cycle indicates a cycle of reporting the packet loss rate of the service data packets.

Based on the foregoing solution, the session management network element notifies the first device and/or the second device to report the packet loss rate, so that a network side such as the session management network element and a policy control network element can implement network control based on the received packet loss rate, thereby helping improve network performance.

In a possible implementation method, the service flow includes at least one quality of service (QoS) flow, and the QoS flow includes at least one service data flow (SDF); and that a session management network element determines that link status detection needs to be performed on a link on which a service flow is located includes: When determining that a steering function of the SDF in the service flow is access traffic steering, switching, and splitting lower layer (ATSSS-LL), the session management network element determines that link status detection needs to be performed on the link on which the service flow is located; when determining that a steering function of the SDF in the service flow is ATSSS-LL, and that a steering mode of the SDF is one of a load-balancing mode, a smallest delay mode, a priority-based mode, or an active-standby mode, the session management network element determines that link status detection needs to be performed on the link on which the service flow is located; or when determining that a link status threshold of the service flow is received from a policy control network element, the session management network element determines that link status detection needs to be performed on the link on which the service flow is located, where the link status threshold includes a packet loss rate threshold.

Based on the foregoing solution, detection of the packet loss rate of the service data packets is performed only when it is determined that link status detection needs to be performed on the link on which the service flow is located. In this way, unnecessary overheads can be reduced.

In a possible implementation method, the service flow includes any one of the following: a protocol data unit (PDU) session, an SDF, an IP data flow, an Ethernet data flow, or at least one QoS flow.

In a possible implementation method, the second device is a terminal device or a user plane network element.

In a possible implementation method, the link status detection indication includes an IP address or/and a port number of the link status detection function.

In a possible implementation method, the session management network element sends identification information of the service flow to the first device and/or the second device, where the identification information includes a PDU session identifier, SDF description information, IP quintuple information, Ethernet flow description information, or at least one QoS flow identifier (QFI); and that the link status detection indication is for enabling a link status detection function includes: The link status detection indication is for enabling a link status detection function for the service flow.

According to a second aspect, an embodiment provides a packet loss rate detection method. The method includes: A second device receives first link status detection information from a first device through a link, where the first link status detection information indicates a quantity of service data packets sent by the first device to the second device on the link; the second device obtains a packet loss rate of the service data packets on the link based on the first link status detection information; and the second device sends the packet loss rate of the service data packets to the first device.

Based on the foregoing solution, the first device may notify, by using link status detection information, the second device of the quantity of the service data packets sent by the first device to the second device on the link, so that the second device may quickly calculate the packet loss rate of the service data packets based on the link status detection information. In addition, because there is no need to parse the service data packets and determine whether the service data packets are lost, a calculation speed of the packet loss rate may be improved.

In a possible implementation method, before the second device receives the first link status detection information from the first device, the second device receives second link status detection information from the first device by using the link; and that the first link status detection information indicates a quantity of service data packets sent by the first device to the second device on the link includes: The first link status detection information indicates: a first quantity of service data packets sent by the first device to the second device on the link within a time when the first device sends the second link status detection information and the first device sends the first link status detection information.

In a possible implementation method, that the second device obtains a packet loss rate of the service data packets on the link based on the first link status detection information includes: The second device obtains, based on the first link status detection information, a packet loss rate of the service data packets on the link within the time when the first device sends the second link status detection information and the first device sends the first link status detection information.

In a possible implementation method, the second link status detection information indicates an initial data packet or an initial time for calculating the packet loss rate.

In a possible implementation method, after the second device receives the first link status detection information from the first device, the second device receives third link status detection information from the first device by using the link, where the third link status detection information indicates: the first quantity, and a second quantity of service data packets sent by the first device to the second device on the link within a time when the first device sends the first link status detection information and the first device sends the third link status detection information.

Based on the foregoing solution, a plurality of quantities of service data packets are carried in one piece of link status detection information, which helps eliminate an impact caused by a loss of the link status detection information, thereby improving accuracy of calculating a packet loss rate.

In a possible implementation method, that the second device obtains a packet loss rate of the service data packets on the link based on the first link status detection information includes: The second device obtains, based on the first link status detection information, a packet loss rate of service data packets on the link within a time when the first device sends the second link status detection information and the first device sends the third link status detection information; and/or the second device obtains, based on the first link status detection information, a packet loss rate of the service data packets on the link within the time when the first device sends the first link status detection information and the first device sends the third link status detection information.

In a possible implementation method, the first link status detection information and the second link status detection information are two adjacent pieces of link status detection information.

In a possible implementation method, that the first link status detection information indicates a quantity of service data packets sent by the first device to the second device on the link includes: The first link status detection information indicates: a third quantity of service data packets sent by the first device to the second device on the link within a time when the first device sends an initial service data packet on the link and the first device sends the first link status detection information.

In a possible implementation method, that the second device obtains a packet loss rate of the service data packets on the link based on the first link status detection information includes: The second device obtains, based on the first link status detection information, a packet loss rate of the service data packets on the link within the time when the first device sends the initial data packet and the first device sends the first link status detection information.

In a possible implementation method, that the first link status detection information indicates a quantity of service data packets sent by the first device to the second device on the link includes: The first link status detection information indicates the first device to send a default quantity of service data packets to the second device on the link.

Based on the foregoing solution, the first device may not need to add quantity information of the sent service data packets to the link status detection information, thereby reducing overheads.

In a possible implementation method, the second device receives indication information from the first device, where the indication information indicates a value of the default quantity.

In a possible implementation method, after the second device receives the first link status detection information from the first device, the second device receives fourth link status detection information from the first device by using the link, where the fourth link status detection information indicates: a fourth quantity of service data packets sent by the first device to the second device on the link within a time when the first device sends the first link status detection information and the first device sends the fourth link status detection information; and that the second device obtains a packet loss rate of the service data packets based on the first link status detection information includes: The second device obtains, based on the first link status detection information and the fourth link status detection information, a packet loss rate of service data packets within a time when the first device sends the second link status detection information and the first device sends the fourth link status detection information.

Based on the foregoing solution, a packet loss rate of service data packets between non-adjacent link status detection information is calculated, so that an impact caused by disorder of the service data packets can be eliminated, thereby improving accuracy of calculating a packet loss rate.

In a possible implementation method, the first link status detection information, the second link status detection information, the third link status detection information, and the fourth link status detection information all include a link status detection data packet.

In a possible implementation method, a service flow on the link includes any one of the following: a PDU session, an SDF, an IP data flow, an Ethernet data flow, or at least one QoS flow.

In a possible implementation method, the first device is a terminal device, and the second device is a user plane network element; or the first device is a user plane network element, and the second device is a terminal device.

In a possible implementation method, the second device receives a link status detection indication from a session management network element, where the link status detection indication is for enabling a link status detection function, and the link status detection function includes a packet loss rate detection function.

In a possible implementation method, the second device receives identification information of the service flow from the session management network element, where the identification information includes a PDU session identifier, SDF description information, IP quintuple information, Ethernet flow description information, or at least one QFI; and that the link status detection indication is for enabling a link status detection function includes: The link status detection indication is for enabling a link status detection function for the service flow.

In a possible implementation method, the second device receives a counting indication from the session management network element, where the counting indication indicates the second device to count the quantity of the service data packets sent by the first device to the second device on the link; or the counting indication indicates the second device to calculate, when receiving link status detection information, a quantity of service data packets received on the link, and send the quantity of the service data packets received on the link to the first device.

In a possible implementation method, the second device receives a packet loss rate detection indication from the session management network element, where the packet loss rate detection indication indicates the second device to calculate the packet loss rate of the service data packets when receiving link status detection information; or the packet loss rate detection indication indicates the second device to calculate a quantity of service data packets received on the link when receiving link status detection information, and calculate the packet loss rate of the service data packets by using the quantity of the service data packets received on the link.

In a possible implementation method, the second device receives a link status reporting indication from the session management network element, where the link status reporting indication indicates to report the packet loss rate of the service data packets; or the second device receives a link status reporting frequency from the session management network element, where the link status reporting frequency indicates a frequency of reporting the packet loss rate of the service data packets; or the second device receives a link status reporting cycle from the session management network element, where the link status reporting cycle indicates a cycle of reporting the packet loss rate of the service data packets.

According to a third aspect, an embodiment provides a packet loss rate detection method. The method includes: A first device sends first link status detection information to a second device through a link, where the first link status detection information indicates a quantity of service data packets sent by the first device to the second device on the link; and the first device receives a packet loss rate of the service data packets, where the packet loss rate of the service data packets is obtained based on the first link status detection information.

Based on the foregoing solution, the first device may notify, by using link status detection information, the second device of the quantity of the service data packets sent by the first device to the second device on the link, so that the second device may quickly calculate the packet loss rate of the service data packets based on the link status detection information. In addition, because there is no need to parse the service data packets and determine whether the service data packets are lost, a calculation speed of the packet loss rate may be improved.

In a possible implementation method, before the first device sends the first link status detection information to the second device, the first device sends second link status detection information to the second device by using the link; and that the first link status detection information indicates a quantity of service data packets sent by the first device to the second device on the link includes: The first link status detection information indicates: a first quantity of service data packets sent by the first device to the second device on the link within a time when the first device sends the second link status detection information and the first device sends the first link status detection information.

In a possible implementation method, the second link status detection information indicates an initial data packet or an initial time for calculating the packet loss rate.

In a possible implementation method, after the first device sends the first link status detection information to the second device, the first device sends third link status detection information to the second device by using the link, where the third link status detection information indicates: the first quantity, and a second quantity of service data packets sent by the first device to the second device on the link within a time when the first device sends the first link status detection information and the first device sends the third link status detection information.

Based on the foregoing solution, a plurality of quantities of service data packets are carried in one piece of link status detection information, which helps eliminate an impact caused by a loss of the link status detection information, thereby improving accuracy of calculating a packet loss rate.

In a possible implementation method, the first link status detection information and the second link status detection information are two adjacent pieces of link status detection information.

In a possible implementation method, that the first link status detection information indicates a quantity of service data packets sent by the first device to the second device on the link includes: The first link status detection information indicates: a third quantity of service data packets sent by the first device to the second device on the link within a time when the first device sends an initial service data packet on the link and the first device sends the first link status detection information.

In a possible implementation method, that the first link status detection information indicates a quantity of service data packets sent by the first device to the second device on the link includes: The first link status detection information indicates the first device to send a default quantity of service data packets to the second device on the link.

Based on the foregoing solution, the first device may not need to add quantity information of the sent service data packets to the link status detection information, thereby reducing overheads.

In a possible implementation, the first device sends indication information to the second device, where the indication information indicates a value of the default quantity.

In a possible implementation method, the first link status detection information, the second link status detection information, and the third link status detection information all include a link status detection data packet.

In a possible implementation method, a service flow on the link includes any one of the following: a PDU session, an SDF, an IP data flow, an Ethernet data flow, or at least one QoS flow.

In a possible implementation method, the first device is a terminal device, and the second device is a user plane network element; or the first device is a user plane network element, and the second device is a terminal device.

In a possible implementation method, the first device receives a link status detection indication from a session management network element, where the link status detection indication is for enabling a link status detection function, and the link status detection function includes a packet loss rate detection function.

In a possible implementation method, the first device receives identification information of the service flow from the session management network element, where the identification information includes a PDU session identifier, SDF description information, IP quintuple information, Ethernet flow description information, or at least one QFI; and that the link status detection indication is for enabling a link status detection function includes: The link status detection indication is for enabling a link status detection function for the service flow.

In a possible implementation method, the first device receives a counting indication from the session management network element, where the counting indication indicates the first device to count the quantity of the service data packets sent by the first device to the second device on the link.

In a possible implementation method, the first device receives a link status reporting indication from the session management network element, where the link status reporting indication indicates to report the packet loss rate of the service data packets; or the first device receives a link status reporting frequency from the session management network element, where the link status reporting frequency indicates a frequency of reporting the packet loss rate of the service data packets; or the first device receives a link status reporting cycle from the session management network element, where the link status reporting cycle indicates a cycle of reporting the packet loss rate of the service data packets.

According to a fourth aspect, an embodiment provides a packet loss rate detection method. The method includes: A second device receives fifth link status detection information from a first device through a link; the second device determines, based on the fifth link status detection information, a quantity of service data packets received by the second device from the first device on the link; and the second device sends the quantity of the service data packets to the first device, where the quantity of the service data packets is for determining a packet loss rate of the service data packets on the link.

Based on the foregoing solution, the second device may notify, by using link status detection information, the first device of the quantity of the service data packets received by the second device from the first device on the link, so that the first device may quickly calculate the packet loss rate of the service data packets based on the quantity of the service data packets received by the second device from the first device on the link. In addition, because there is no need to parse the service data packets and determine whether the service data packets are lost, a calculation speed of the packet loss rate may be improved.

In a possible implementation method, before the second device receives the fifth link status detection information from the first device, the second device receives sixth link status detection information from the first device by using the link; and that the second device determines, based on the fifth link status detection information, a quantity of service data packets received by the second device from the first device on the link includes: The second device determines a quantity of service data packets received by the second device from the first device on the link within a time when the first device sends the sixth link status detection information and the first device sends the fifth link status detection information.

In a possible implementation method, the second device sends, to the first device, time information corresponding to the quantity of the service data packets.

In a possible implementation method, the time information includes a time period between that the first device sends the sixth link status detection information and that the first device sends the fifth link status detection information.

In a possible implementation method, the fifth link status detection information and the sixth link status are link status detection data packets, and the time information includes sequence number information corresponding to the link status detection data packets.

In a possible implementation method, a service flow on the link includes any one of the following: a PDU session, an SDF, an IP data flow, an Ethernet data flow, or at least one QoS flow.

In a possible implementation method, the first device is a terminal device, and the second device is a user plane network element; or the first device is a user plane network element, and the second device is a terminal device.

In a possible implementation method, the second device receives a link status detection indication from a session management network element, where the link status detection indication is for enabling a link status detection function, and the link status detection function includes a packet loss rate detection function.

In a possible implementation method, the second device receives identification information of the service flow from the session management network element, where the identification information includes a PDU session identifier, SDF description information, IP quintuple information, Ethernet flow description information, or at least one QFI; and that the link status detection indication is for enabling a link status detection function includes: The link status detection indication is for enabling a link status detection function for the service flow.

In a possible implementation method, the second device receives a counting indication from the session management network element, where the counting indication indicates the second device to count the quantity of the service data packets sent by the first device to the second device on the link; or the counting indication indicates the second device to calculate, when receiving link status detection information, a quantity of service data packets received on the link, and send the quantity of the service data packets received on the link to the first device.

According to a fifth aspect, an embodiment provides a packet loss rate detection method. The method includes: A first device sends fifth link status detection information to a second device through a link; the first device receives, from the second device, a quantity of service data packets received by the second device from the first device on the link, where the quantity of the service data packets is determined based on the fifth link status detection information; and the first device determines a packet loss rate of the service data packets on the link based on the quantity of the service data packets.

Based on the foregoing solution, the second device may notify, by using link status detection information, the first device of the quantity of the service data packets received by the second device from the first device on the link, so that the first device may quickly calculate the packet loss rate of the service data packets based on the quantity of the service data packets received by the second device from the first device on the link. In addition, because there is no need to parse the service data packets and determine whether the service data packets are lost, a calculation speed of the packet loss rate may be improved.

In a possible implementation method, before the first device sends the fifth link status detection information to the second device, the first device sends sixth link status detection information to the second device by using the link, and the quantity of the service data packets is a quantity of service data packets received by the second device from the first device on the link within a time when the first device sends the sixth link status detection information and the first device sends the fifth link status detection information. That the first device determines a packet loss rate of the service data packets on the link based on the quantity of the service data packets includes: The first device determines the packet loss rate of the service data packets on the link based on the quantity of the service data packets and the quantity of the service data packets sent by the first device to the second device on the link within the time when the first device sends the sixth link status detection information and the first device sends the fifth link status detection information.

In a possible implementation method, the first device receives time information corresponding to the quantity of the service data packets from the second device.

In a possible implementation method, the time information includes a time period between that the first device sends the sixth link status detection information and that the first device sends the fifth link status detection information.

In a possible implementation method, the fifth link status detection information and the sixth link status are link status detection data packets, and the time information includes sequence number information corresponding to the link status detection data packets.

In a possible implementation method, a service flow on the link includes any one of the following: a PDU session, an SDF, an IP data flow, an Ethernet data flow, or at least one QoS flow.

In a possible implementation method, the first device is a terminal device, and the second device is a user plane network element; or the first device is a user plane network element, and the second device is a terminal device.

In a possible implementation method, the first device receives a link status detection indication from a session management network element, where the link status detection indication is for enabling a link status detection function, and the link status detection function includes a packet loss rate detection function.

In a possible implementation method, the first device receives identification information of the service flow from the session management network element, where the identification information includes a PDU session identifier, SDF description information, IP quintuple information, Ethernet flow description information, or at least one QFI; and that the link status detection indication is for enabling a link status detection function includes: The link status detection indication is for enabling a link status detection function for the service flow.

In a possible implementation method, the first device receives a counting indication from the session management network element, where the counting indication indicates the first device to count the quantity of the service data packets sent by the first device to the second device on the link.

In a possible implementation method, the first device receives a packet loss rate detection indication from the session management network element, where the packet loss rate detection indication indicates the first device to calculate, when receiving, from the second device, the quantity of the received service data packets that is counted by the second device, the packet loss rate of the service data packets.

In a possible implementation method, the first device receives a link status reporting indication from the session management network element, where the link status reporting indication indicates to report the packet loss rate of the service data packets; or the first device receives a link status reporting frequency from the session management network element, where the link status reporting frequency indicates a frequency of reporting the packet loss rate of the service data packets; or the first device receives a link status reporting cycle from the session management network element, where the link status reporting cycle indicates a cycle of reporting the packet loss rate of the service data packets.

According to a sixth aspect, an embodiment provides a communication apparatus. The apparatus may be a session management network element, or may be a chip used for the session management network element. The apparatus has a function of implementing any implementation method in the first aspect. The function may be implemented by hardware, or may be implemented by hardware executing corresponding software. The hardware or the software includes one or more modules corresponding to the function.

According to a seventh aspect, an embodiment provides a communication apparatus. The apparatus may be a second device, or may be a chip used for the second device. The apparatus has a function of implementing any implementation method in the second aspect or the fourth aspect. The function may be implemented by hardware, or may be implemented by hardware executing corresponding software. The hardware or the software includes one or more modules corresponding to the function.

According to an eighth aspect, an embodiment provides a communication apparatus. The apparatus may be a first device, or may be a chip used for the first device. The apparatus has a function of implementing any implementation method in the third aspect or the fifth aspect. The function may be implemented by hardware, or may be implemented by hardware executing corresponding software. The hardware or the software includes one or more modules corresponding to the function.

According to a ninth aspect, an embodiment provides a communication apparatus, including a processor and a memory, where the memory is configured to store computer instructions, and when the apparatus runs, the processor executes the computer instructions stored in the memory, so that the apparatus performs any implementation method in the first aspect to the fifth aspect.

According to a tenth aspect, an embodiment provides a communication apparatus, including units or means for performing steps of any implementation method in the first aspect to the fifth aspect.

According to an eleventh aspect, an embodiment provides a communication apparatus, including a processor and an interface circuit. The processor is configured to communicate with another apparatus by using the interface circuit, and perform any implementation method in the first aspect to the fifth aspect. There are one or more processors.

According to a twelfth aspect, an embodiment provides a communication apparatus, including a processor configured to be coupled to a memory. The processor is configured to invoke a program stored in the memory, to perform any implementation method in the first aspect to the fifth aspect. The memory may be located inside or outside the apparatus. There are one or more processors.

According to a thirteenth aspect, an embodiment further provides a computer-readable storage medium. The computer-readable storage medium stores instructions. When the instructions are run on a computer, any implementation method in the first aspect to the fifth aspect is performed.

According to a fourteenth aspect, an embodiment further provides a computer program product. The computer program product includes a computer program. When the computer program is run, any implementation method in the first aspect to the fifth aspect is performed.

According to a fifteenth aspect, an embodiment further provides a chip system, including a processor configured to perform any implementation method in the first aspect to the fifth aspect.

According to a sixteenth aspect, an embodiment further provides a communication system, including a second device configured to perform any implementation method in the second aspect and a first device configured to perform any implementation method in the third aspect.

In an implementation method, the communication system further includes a session management network element configured to perform any implementation method in the first aspect.

According to a seventeenth aspect, an embodiment further provides a communication system, including a second device configured to perform any implementation method in the fourth aspect and a first device configured to perform any implementation method in the fifth aspect.

In an implementation method, the communication system further includes a session management network element configured to perform any implementation method in the first aspect.

According to an eighteenth aspect, an embodiment further provides a communication system, including: a session management network element configured to perform any implementation method in the first aspect; and a first device or a second device configured to receive a link status detection indication from the session management network element, where the link status detection indication is for enabling a link status detection function.

DETAILED DESCRIPTION

To make the objectives, technical solutions, and advantages clearer, the following further describes this disclosure in detail with reference to the accompanying drawings. A specific operation method in a method embodiment may also be applied to an apparatus embodiment or a system embodiment.

Figures 1A, 1B:
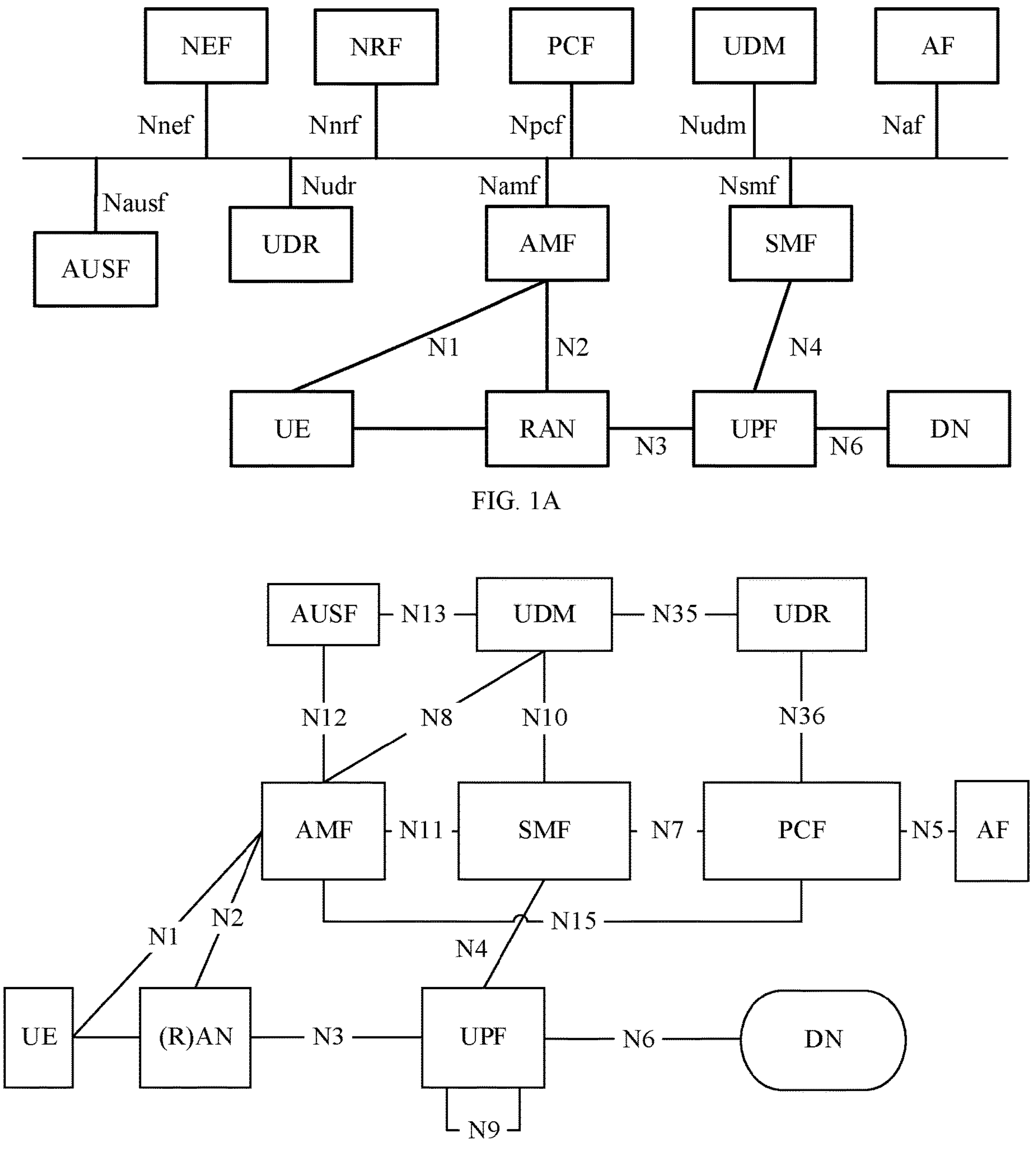
FIG. 1A is a schematic diagram of a 5G network architecture based on a service-based architecture.
FIG. 1B is a schematic diagram of a 5G network architecture based on a point-to-point interface.

FIG. 1A is a schematic diagram of a fifth generation (5G) network architecture based on a service-based architecture. The 5G network architecture shown in FIG. 1A may include three parts: a terminal device part, a data network (DN), and an operator network part. The following briefly describes functions of some of the network elements.

The operator network may include one or more of the following network elements: an authentication server function (AUSF) network element, a network exposure function (NEF) network element, a policy control function (PCF) network element, a unified data management (UDM) network element, a unified data repository (UDR) network element, a network repository function (NRF) network element, an access and mobility management function (AMF) network element, a session management function (SMF) network element, a radio access network (RAN) network element, and a user plane function (UPF) network element. In the foregoing operator network, a part other than the radio access network may be referred to as a core network. In a possible implementation method, the operator network further includes an application function (AF) network element.

A terminal device is a device having a wireless transceiver function. The terminal device may be deployed on land, including an indoor device, an outdoor device, a handheld device, or a vehicle-mounted device; may be deployed on water (for example, on a ship); or may be deployed in the air (for example, on a plane, a balloon, or a satellite). The terminal device may be a mobile phone, a tablet computer (e.g., pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or a user equipment (UE).

The terminal device may establish a connection to the operator network through an interface (for example, N1) provided by the operator network, and use services such as data and/or voice provided by the operator network. The terminal device may further access the DN through the operator network, and use an operator service deployed on the DN and/or a service provided by a third party. The third party may be a service provider other than the operator network and the terminal device, and may provide other services such as data and/or voice for the terminal device. A specific representation form of the third party may be specifically determined based on an actual scenario, and is not limited herein.

The RAN is a subnetwork of the operator network, and is an implementation system between a service node in the operator network and the terminal device. To access the operator network, the terminal device first passes through the RAN, and further may be connected to the service node in the operator network through the RAN. A RAN device is a device that provides a wireless communication function for the terminal device, and the RAN device is also referred to as an access network device. The RAN device includes but is not limited to: a next generation NodeB (gNodeB, gNB), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a transmission reception point (TRP), a transmission point (TP), or a mobile switching center in 5G.

The AMF network element mainly performs functions such as mobility management and access authentication/authorization. In addition, the AMF network element is further responsible for transferring a user policy between the UE and the PCF.

The SMF network element mainly performs functions such as session management, execution of a control policy delivered by the PCF, UPF selection, and UE Internet Protocol (IP) address assignment.

The UPF network element, serving as an interface to the data network, implements functions such as user-plane data forwarding, session- or flow-level charging statistics, and bandwidth throttling.

The UDM network element is mainly responsible for functions such as subscription data management and user access authorization.

The UDR is mainly responsible for a function of accessing subscription data, policy data, application data, and another type of data.

The NEF network element is mainly configured to support capability and event exposure.

The AF network element mainly transfers a requirement of an application side on a network side, for example, a QoS requirement or user status event subscription. The AF may be a third-party functional entity, or may be an operator-deployed application service, for example, an IP Multimedia Subsystem (IMS) voice call service.

The PCF network element is mainly responsible for policy control functions such as charging for a session level or an SDF level, QoS bandwidth guarantee, mobility management, and UE policy decision. In this architecture, PCFs connected to the AMF and the SMF are respectively an access and mobility management PCF (AM-PCF) and a session management PCF (SM-PCF). In an actual deployment scenario, the PCFs may not be a same PCF entity.

The NRF network element may be configured to provide a network element discovery function, and provide, based on a request from another network element, network element information corresponding to a network element type. The NRF further provides a network element management service, for example, registration, update, and deregistration of a network element and subscription and push of a network element status.

The AUSF network element is mainly responsible for authenticating a user, to determine whether to allow the user or a device to access a network.

The DN is a network outside the operator network. The operator network may access a plurality of DNs. A plurality of services may be deployed on the DN, and the DN may provide services such as data and/or voice for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, and transmit collected sensor data to the control server based on the instructions. For another example, the DN is an internal office network of a company, a mobile phone or a computer of an employee of the company may be a terminal device, and the mobile phone or the computer of the employee may access information, data resources, and the like in the internal office network of the company.

Nausf, Nnef, Npcf, Nudm, Naf, Namf, Nsmf, N1, N2, N3, N4, and N6 in FIG. 1A are interface sequence numbers. For meanings of these interface sequence numbers, refer to meanings defined in the 3rd Generation Partnership Project (3GPP) standard protocol. This is not limited herein.

FIG. 1B is a schematic diagram of a 5G network architecture based on a point-to-point interface. For descriptions of functions of network elements, refer to the descriptions of functions of corresponding network elements in FIG. 1A. Details are not described herein again. A main difference between FIG. 1A and FIG. 1B lies in that interfaces between network elements in FIG. 1B are point-to-point interfaces, and interfaces between network elements in FIG. 1A are service-based interfaces.

In the architecture shown in FIG. 1B, names and functions of interfaces between network elements are as follows:

(1) N7 is an interface between the PCF and the SMF, and may be configured to deliver a PDU session granularity control policy and an SDF granularity control policy.

(2) N15 is an interface between the PCF and the AMF, and may be configured to deliver a UE policy and an access control related policy.

(3) N5 is an interface between the AF and the PCF, and may be configured to deliver an application service request and report a network event.

(4) N4 is an interface between the SMF and the UPF, and may be configured to transfer information between a control plane and a user plane, including delivery of forwarding rules, QoS control rules, traffic statistics rules, and the like from the control plane to the user plane, and reporting of user plane information.

(5) N11 is an interface between the SMF and the AMF, and may be configured to transfer PDU session tunnel information between the RAN and the UPF, transfer a control message to be sent to the UE, and transfer radio resource control information to be sent to the RAN.

(6) N2 is an interface between the AMF and the RAN, and may be configured to transfer radio bearer control information and the like from a core network side to the RAN.

(7) N1 is an interface between the AMF and the UE, and may be configured to transfer the QoS control rules and the like to the UE.

(8) N8 is an interface between the AMF and the UDM, and may be used by the AMF to obtain, from the UDM, subscription data and authentication data related to access and mobility management, and used by the AMF to register current mobility management related information of the UE with the UDM.

(9) N10 is an interface between the SMF and the UDM, and may be used by the SMF to obtain, from the UDM, subscription data related to session management, and used by the SMF to register current session related information of the UE with the UDM.

(10) N35 is an interface between the UDM and the UDR, and may be used by the UDM to obtain user subscription data information from the UDR.

(11) N36 is an interface between the PCF and the UDR, and may be used by the PCF to obtain policy related subscription data and application data related information from the UDR.

(12) N12 is an interface between the AMF and the AUSF, and may be used by the AMF to initiate an authentication procedure to the AUSF, where a subscription concealed identifier (SUCI) may be carried as a subscription identifier.

(13) N13 is an interface between the UDM and the AUSF, and may be used by the AUSF to obtain a user authentication vector from the UDM, to perform an authentication procedure.

Figure 1C:
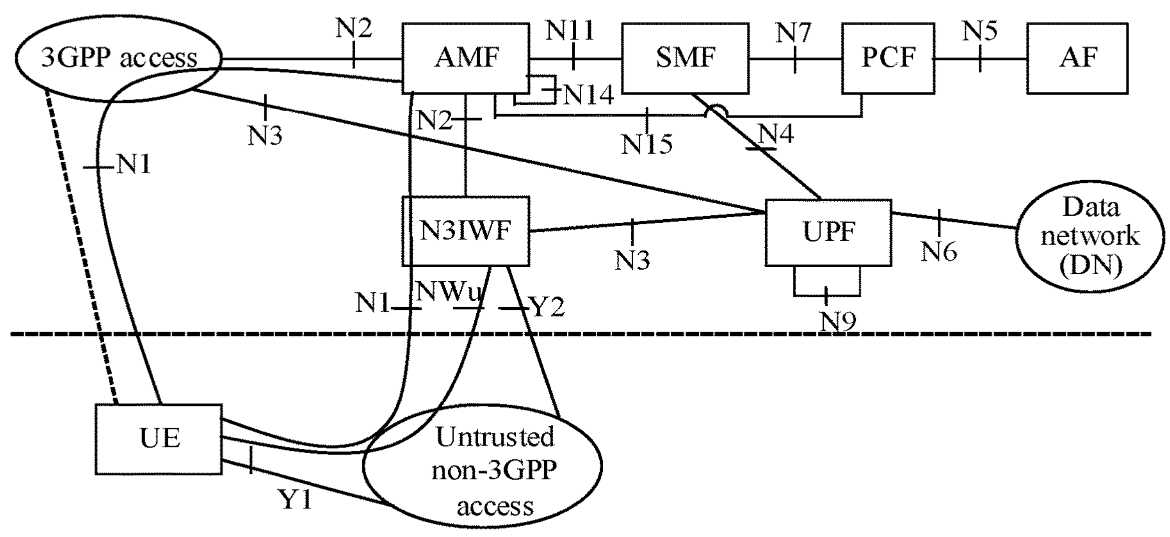
FIG. 1C is another schematic diagram of a 5G network architecture based on a point-to-point interface.

When a 5G core network supports untrusted non-3GPP access, the 5G network architecture based on a point-to-point interface is shown in FIG. 1C. An access network includes a 3GPP access network and a non-3GPP access network. An access device in the 3GPP access network may be referred to as a radio access network (RAN) device. An access device in the non-3GPP access network may be referred to as a non-3GPP interworking function (N3IWF) device. The N3IWF device may include, for example, a router.

It should be noted that when the 5G core network supports trusted non-3GPP access, a 5G network architecture of the 5G core network is similar to that in FIG. 1C. The untrusted non-3GPP access in FIG. 1C may be replaced with trusted non-3GPP access, and the N3IWF may be replaced with a trusted non-3GPP access gateway.

It may be understood that the foregoing network elements or functions may be network elements in a hardware device, software functions running on dedicated hardware, or virtualization functions instantiated on a platform (for example, a cloud platform). Optionally, the foregoing network elements or functions may be implemented by one device, or may be jointly implemented by a plurality of devices, or may be one functional module in one device. This is not specifically limited in embodiments.

The mobility management network element, the session management network element, the policy control network element, the access network device, and the user plane network element may be the AMF, the SMF, the PCF, the RAN, and the UPF in FIG. 1A, FIG. 1B, or FIG. 1C, or may be network elements that have functions of the AMF, the SMF, the PCF, the RAN, and the UPF in future communication such as a sixth generation (6G) network. This is not limited in this disclosure. For ease of description, an example in which the mobility management network element, the session management network element, the policy control network element, the access network device, and the user plane network element are respectively the AMF, the SMF, the PCF, the RAN, and the UPF is used for description. Further, an example in which the terminal device is UE is used for description.

For ease of understanding the solutions in embodiments, the following first explains and describes some terms or nouns in embodiments.

1. Multi-Access PDU (MAPDU) Session

Figure 2:
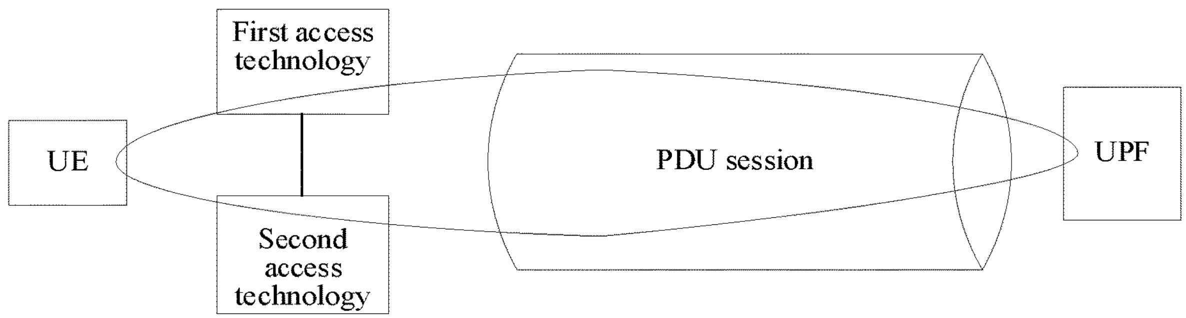
FIG. 2 is a schematic diagram of a relationship between a PDU session and access technologies.

A single PDU session may support a plurality of access technologies. FIG. 2 is a schematic diagram of a relationship between a PDU session and access technologies. Refer to FIG. 2. A PDU session may be accessed by using a first access technology, or may be accessed by using a second access technology. In this scenario, the PDU session may be referred to as an MAPDU session.

The first access technology is different from the second access technology, or the first access technology and the second access technology are a same access technology but are separately used by different access network devices. The first access technology and the second access technology may be but are not limited to any two of the following access technologies: 3GPP access, non-3GPP access, Long-Term Evolution (LTE) access, 5G RAN access, trusted non-3GPP access, untrusted non-3GPP access, wireless local area network (WLAN) access, fixed network access, and the like.

The MAPDU session may implement mobility or concurrency of a service flow between different access technologies. If the service flow is transmitted by using the first access technology, the service flow is subsequently moved to be transmitted by using the second access technology. Alternatively, service data packets of the service flow are transmitted by using both the first access technology and the second access technology, to increase a bandwidth.

2. Service Flow

In embodiments, the service flow includes a PDU session, an SDF, an IP data flow, an Ethernet data flow, or at least one QoS flow.

One PDU session includes one or more QoS flows. A PDU session is identified by a PDU session identifier (ID).

One QoS flow includes one or more SDFs.

One SDF includes one or more IP flows, or includes one or more Ethernet flows. An IP data packet or an Ethernet data packet in one SDF corresponds to same SDF description information.

One IP flow includes one or more IP data packets, and the IP data packets in one IP flow have same IP quintuple information. The IP quintuple information includes at least one of a source IP address, a destination IP address, a source port number, a destination port number, or a protocol number.

One Ethernet flow includes one or more Ethernet data packets, and the Ethernet data packets in one Ethernet flow have same Ethernet flow description information. The Ethernet flow description information includes at least one of a source MAC address or a destination MAC address.

In embodiments, the service data packet includes an IP data packet, an Ethernet data packet, or the like.

2. Steering Mode of SDF

The steering mode of the SDF indicates how the SDF is selected, moved, or split in data transmission channels of two access technologies. The steering mode of the SDF includes but is not limited to:

1. Active-Standby Mode

A link corresponding to an active access technology is an active link and can provide a service. A link corresponding to a standby access technology is a standby link, and is in a standby state. The two links may be switched as a policy updates.

In this mode, when the link corresponding to the active access technology is available, the SDF is transmitted in the access technology; and when the link corresponding to the active access technology is unavailable, the SDF is switched to the standby link corresponding to the standby access technology. When the link of the active access technology recovers from an unavailable state to an available state, the SDF may be switched back to the active access technology. If the standby access technology is not defined, the SDF can be transmitted only in the active access technology.

2. Smallest Delay Mode

In this mode, the SDF is allocated to an access technology with a smallest round-trip time (RTT) for transmission. The UE and the UPF may measure an RTT of a link of the first access technology and an RTT of a link of the second access technology, and compare the RTTs of the two links. If the RTT of the link of the first access technology is less than the RTT of the link of the second access technology, the UE and the UPF select to transmit the SDF in the first access technology. If the RTT of the link of the second access technology is less than the RTT of the link of the first access technology, the UE and the UPF select to transmit the SDF in the second access technology. If the RTT of the link of the first access technology is equal to the RTT of the link of the second access technology, the UE and the UPF select to transmit the SDF in the first access technology or the second access technology. In addition, if one access technology is unavailable and a policy and charging control (PCC) rule allows, all the SDF may be switched to a data transmission channel of another access technology.

3. Load-Balancing Mode

In this mode, if two access technologies are available, the SDF is transmitted in the two access technologies. The SDF is transmitted in data transmission channels of the two access technologies according to a percentage of the transmitted SDF.

If one access technology is unavailable, all the SDF is switched to another access technology, which is equivalent to a percentage of the SDF transmitted in the available access technology is 100%.

4. Priority-Based Mode

In this mode, all the SDF is directed to a high-priority access technology until a link of the access technology is congested. When the link of the high-priority access technology is unavailable, all the SDF is switched to a low-priority access technology for transmission.

3. Steering Function of SDF

The steering function of the SDF indicates a function of performing steering the SDF. The steering function of the SDF includes but is not limited to:

1. ATSSS-LL

The ATSSS-LL function is implemented at an IP layer or below an IP layer. Therefore, the ATSSS-LL function is referred to as a steering function at a bottom layer. The foregoing steering function selects, based on a steering mode and a current link status, a link corresponding to an access technology for service data packets to transmit the service data packets. The link status is a link status of at least one link between the UE and the UPF. The UE and UPF detect the link status based on a link status detection protocol, such as a performance measurement function (PMF) protocol. The ATSSS-LL selects, switches, or splits a service flow based on a link status detection result and a steering mode.

2. Multi-Path Transmission Control Protocol (MPTCP)

An MPTCP steering function is a service data packet steering, switching, or splitting function implemented based on the MPTCP. Based on the steering mode and the link status detected by a TCP layer, the steering function selects, for the service data packets, a link corresponding to an access technology to transmit the service data packets.

In a multi-access scenario, for a service flow (such as a PDU session, an IP flow, an Ethernet flow, an SDF, or at least one QoS flow), because an access technology needs to be selected based on a link status (such as a packet loss rate, a delay, or a bandwidth), the UE and the UPF need to detect the link status in real time. Certainly, in a single-access scenario, for the service flow, the UE and the UPF may also need to detect the link status in real time. For example, the UE or the UPF needs to determine, based on the link status, how to adjust a transmission speed of the service data packets.

Currently, a method for detecting a packet loss rate in the link status by the UE and the UPF is: performing link status awareness based on a transport layer protocol, for example, a Transmission Control Protocol (TCP) or a QUIC protocol, where UDP is short for the User Datagram Protocol (UDP). Specifically, a transmit end adds a sequence number to each sent service data packet, and a receive end sends an acknowledgment (ACK) for each service data packet to the transmit end after receiving each service data packet, so that the receive end may determine, based on the sequence number of each service data packet, a quantity of service data packets actually sent by the transmit end, and further determine a packet loss rate of the service data packets based on the quantity of the service data packets actually sent by the transmit end and a quantity of service data packets actually received by the receive end. The transmit end may determine the packet loss rate of the service data packets based on a quantity of acknowledgment responses of the service data packets sent by the receive end and the quantity of the service data packets actually sent by the transmit end.

In an uplink direction, the transmit end is the UE, and the receive end is the UPF. In a downlink direction, the transmit end is the UPF, and the receive end is the UE.

The foregoing solution of determining a packet loss rate of service data packets based on a transport layer protocol has the following problems:

First, there is a specific delay. For example, when a packet loss rate is measured based on TCP, after sending a service data packet to the receive end, the transmit end needs one or more smallest RTTs. If no acknowledgment response for the service data packet is received before the one or more RTTs, the transmit end determines that the service data packet is lost, that is, determines that the service data packet is not received by the receive end. Therefore, when the transmit end calculates the packet loss rate, a specific delay exists, and the delay is related to a time for waiting for an acknowledgment response.

Second, efficiency is low. Because the packet loss rate is determined based on the transport layer protocol, the transmit end or the receive end needs to parse the service data packets based on the transport layer protocol. Consequently, efficiency of determining the packet loss rate is low.

To quickly and accurately determine the packet loss rate, an embodiment provides a corresponding packet loss rate detection method.

It should be noted that, in embodiments, a first device serves a sender of service data packets, and a second device serves as a recipient of the service data packets. In the uplink direction, the first device is the UE, and the second device is the UPF. In the downlink direction, the first device is the UPF, and the second device is the UE.

It should be noted that, in embodiments, link status detection information (for example, first link status detection information, second link status detection information, third link status detection information, fourth link status detection information, fifth link status detection information, and sixth link status detection information in the following embodiments) may include a link status detection data packet, and the link status detection data packet is different from a service data packet. Specifically, the service data packet is used for transmitting data, the link status detection data packet indicates a quantity of received or sent service data packets, and the link status detection data packet may be used for calculating a packet loss rate of the service data packets.

It should be noted that, in embodiments, a "link" may be understood as a "channel", for example, a 3GPP link or a non-3GPP link. A service flow is transmitted on a link, and the service flow may be a PDU session, an SDF, an IP flow, an Ethernet flow, or at least one QoS flow. Link status detection is to detect a status of a link on which the service flow is located.

In embodiments, a minimum transmission unit transmitted in the service flow is a service data packet. In other words, the PDU session, the SDF, the Ethernet flow, the IP flow, or the at least one QoS flow includes one or more service data packets.

Figure 3:
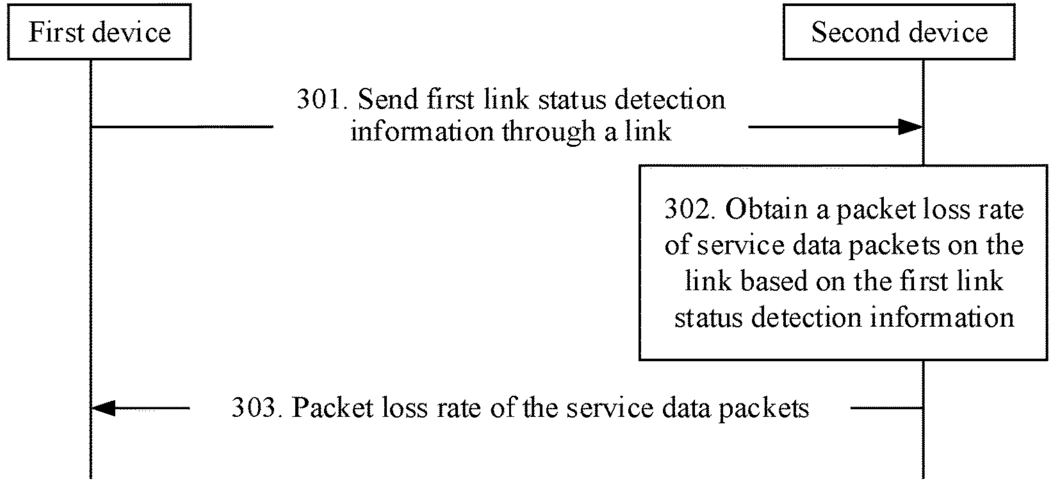
FIG. 3 is a schematic diagram of a packet loss rate detection method according to an embodiment.

FIG. 3 is a schematic diagram of a packet loss rate detection method according to an embodiment. The method includes the following steps.

Step 301: A first device sends first link status detection information to a second device through a link. Correspondingly, the second device receives the first link status detection information.

The first link status detection information indicates a quantity of service data packets sent by the first device to the second device on the link.

Step 302: The second device obtains a packet loss rate of service data packets on the link based on the first link status detection information.

For example, the second device determines, based on the first link status detection information, the quantity of the service data packets sent by the first device to the second device on the link, and then the second device may further obtain a quantity of service data packets received by the second device from the first device on the link, so that the second device may calculate the packet loss rate of the service data packets on the link based on a ratio of the two quantities.

Step 303: The second device sends the packet loss rate of the service data packets to the first device. Correspondingly, the first device receives the packet loss rate of the service data packets.

After receiving the packet loss rate of the service data packets, the first device may evaluate the link, so as to determine a corresponding policy based on an evaluation result, or report the packet loss rate of the service data packets to another device (such as an SMF or a PCF).

Based on the foregoing solution, the first device may notify, by using link status detection information, the second device of the quantity of the service data packets sent by the first device to the second device on the link, so that the second device may quickly calculate the packet loss rate of the service data packets based on the link status detection information. In addition, because there is no need to parse the service data packets and determine whether the service data packets are lost, a calculation speed of the packet loss rate may be improved.

In an implementation method, before step 301, the first device further sends second link status detection information to the second device by using the link. Correspondingly, the second device receives the second link status detection information, and the first link status detection information specifically indicates: a first quantity of service data packets sent by the first device to the second device on the link within a time when the first device sends the second link status detection information and the first device sends the first link status detection information. In this case, step 302 may be specifically: The second device obtains, based on the first link status detection information, a packet loss rate of the service data packets on the link within the time when the first device sends the second link status detection information and the first device sends the first link status detection information. The second link status detection information and the first link status detection information may be two adjacent pieces of link status detection information, or may be two non-adjacent pieces of link status detection information.

The following describes this solution with reference to a specific example.

Figure 4A:
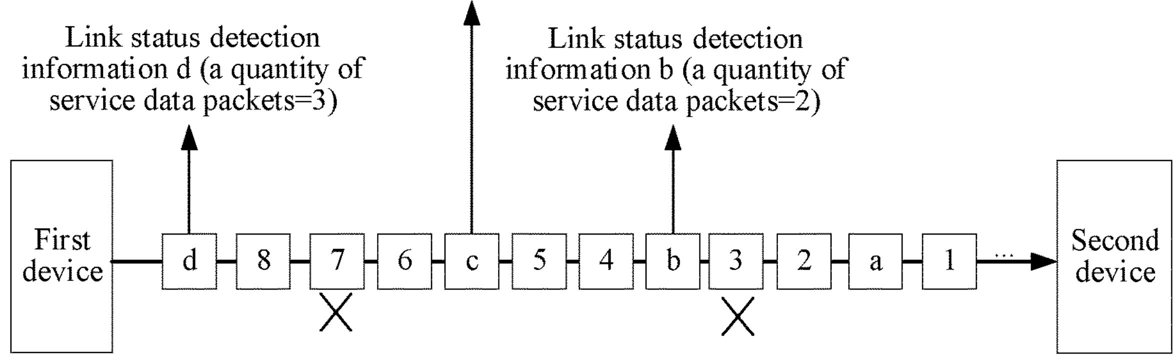
FIG. 4A to FIG. 4G are diagrams of examples of transmission of link status detection information and service data packets according to an embodiment.

FIG. 4A is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which the first link status detection information and the second link status detection information are two adjacent pieces of link status detection information is used. When the first link status detection information is the link status detection information d, the second link status detection information is the link status detection information c; when the first link status detection information is the link status detection information c, the second link status detection information is the link status detection information b; and when the first link status detection information is the link status detection information b, the second link status detection information is the link status detection information a. The link status detection information d carries a quantity of service data packets between the link status detection information c and the link status detection information d, that is, the quantity of the service data packets carried in the link status detection information d is 3. The link status detection information c carries a quantity of service data packets between the link status detection information b and the link status detection information c, that is, the quantity of the service data packets carried in the link status detection information c is 2. The link status detection information b carries a quantity of service data packets between the link status detection information a and the link status detection information b, that is, the quantity of the service data packets carried in the link status detection information b is 2.

For this example, a quantity of service data packets sent between two adjacent pieces of link status detection information is indicated or carried by the later link status detection information of the two adjacent pieces of link status detection information.

For this example, the second device may calculate a packet loss rate of service data packets between two adjacent pieces of link status detection information. For example, assuming that the service data packets 3 and 7 are lost, that is, the second device does not receive the service data packets 3 and 7, the second device may obtain through calculation: a packet loss rate of the service data packets between the link status detection information a and the link status detection information b is 50%; a packet loss rate of the service data packets between the link status detection information b and the link status detection information c is 0%; and a packet loss rate of the service data packets between the link status detection information c and the link status detection information d is 33.3%.

Certainly, the second device may further obtain through calculation: a packet loss rate of the service data packets between the link status detection information a and the link status detection information c is 25%; a packet loss rate of the service data packets between the link status detection information a and the link status detection information d is 28.6%; and a packet loss rate of the service data packets between the link status detection information b and the link status detection information d is 20%.

Whether the second device specifically calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

When the first link status detection information is not adjacent to the second link status detection information, the second link status detection information indicates an initial data packet or an initial time for calculating the packet loss rate, that is, the quantity of the service data packets sent by the first device that is indicated by the first link status detection information is calculated by using the second link status detection information as a reference.

The following describes this solution with reference to a specific example.

Figure 4B:
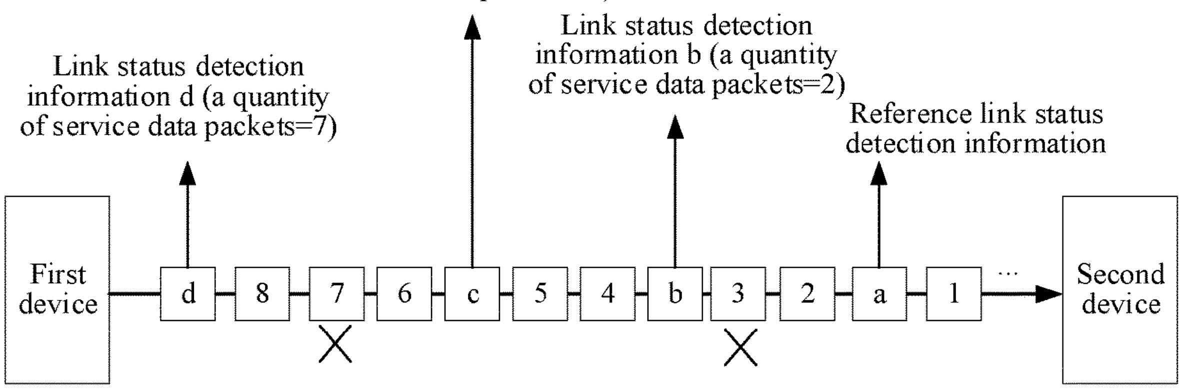

FIG. 4B is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which the link status detection information a is used as reference link status detection information is used. The link status detection information a is also referred to as the second link status detection information, and the first link status detection information may be the link status detection information b, c, or d. The link status detection information b carries a quantity of service data packets between the link status detection information a and the link status detection information b, that is, the quantity of the service data packets carried in the link status detection information b is 2. The link status detection information c carries a quantity of service data packets between the link status detection information a and the link status detection information c, that is, the quantity of the service data packets carried in the link status detection information c is 4. The link status detection information d carries a quantity of service data packets between the link status detection information a and the link status detection information d, that is, the quantity of the service data packets carried in the link status detection information d is 7.

For this example, a quantity of service data packets carried in one piece of link status detection information is a quantity of service data packets sent between the link status detection information and the reference link status detection information.

For this example, the second device may calculate a packet loss rate of service data packets between adjacent link status detection information. For example, assuming that the service data packets 3 and 7 are lost, that is, the second device does not receive the service data packets 3 and 7, the second device may obtain through calculation: a packet loss rate of the service data packets between the link status detection information a and the link status detection information b is 50%; a packet loss rate of the service data packets between the link status detection information a and the link status detection information c is 25%; and a packet loss rate of the service data packets between the link status detection information a and the link status detection information d is 28.6%.

Alternatively, the second device may also calculate, based on a quantity of service data packets carried in each piece of link status detection information, a quantity of service data packets sent between two adjacent pieces of link status detection information, so as to calculate a packet loss rate of service data packets between any two adjacent pieces of link status detection information.

Whether the second device calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

It should be noted that, in this example, different link status detection information may correspond to same reference link status detection information, or may correspond to different reference link status detection information. For example, in the foregoing example, the link status detection information b, c, and d all use the link status detection information a as the reference link status detection information. For another example, in the foregoing example, the link status detection information b and c may use the link status detection information a as the reference link status detection information, and the link status detection information d uses the link status detection information b as the reference link status detection information. In this embodiment, it is not limited whether the reference link status detection information is fixed link status detection information or a plurality of pieces of link status detection information.

Optionally, the link status detection information may further carry identification information of the reference link status detection information, so that the second device may learn which link status detection information is used as a reference for counting a quantity of service data packets carried in the link status detection information. For example, in the foregoing example, the link status detection information b, c, and d may carry identification information of the link status detection information a.

Certainly, a moment before or after sending of a service data packet may also be used as a reference time, and then a quantity of service data packets sent by the first device that is indicated by the link status detection information (for example, the first link status detection information) is calculated by using the reference time as a reference. In an implementation method, the reference time may be a moment before a sending time of an initial service data packet. Therefore, the first link status detection information in step 301 may specifically indicate: a third quantity of service data packets sent by the first device to the second device on the link within a time when the first device sends the initial service data packet on the link and the first device sends the first link status detection information. In this case, step 302 may be specifically: The second device obtains, based on the first link status detection information, a packet loss rate of the service data packets on the link within the time when the first device sends the initial data packet and the first device sends the first link status detection information.

The following describes this solution with reference to a specific example.

Figure 4C:
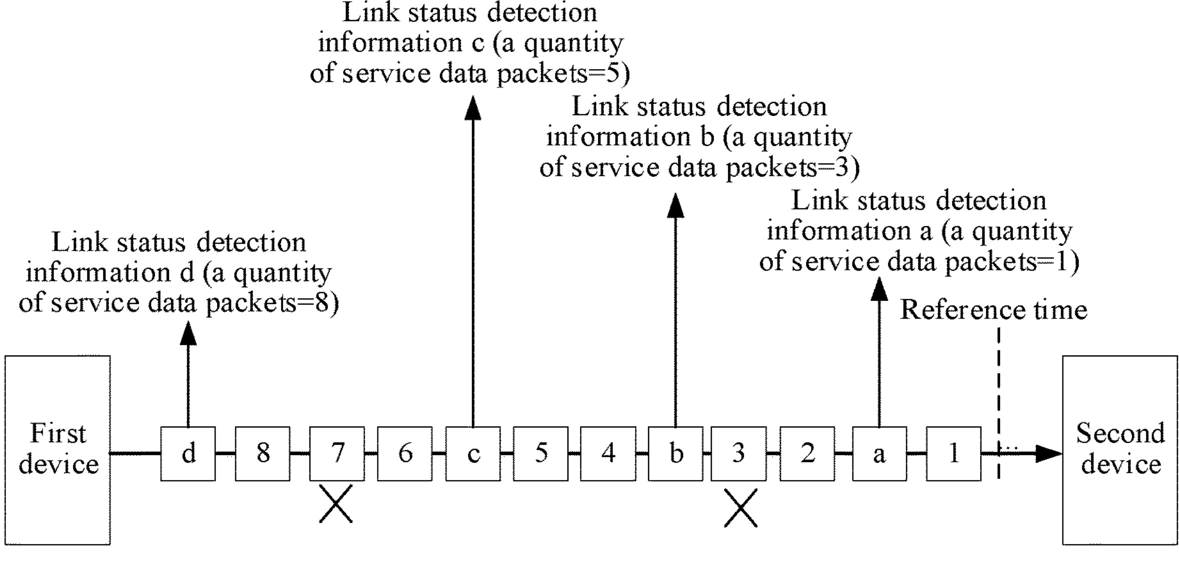

FIG. 4C is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which a moment before a sending moment of the service data packet 1 is used as a reference time is used. The first link status detection information may be the link status detection information a, b, c, or d in the example. The link status detection information a carries a quantity of service data packets between the reference time and the link status detection information a, that is, the quantity of the service data packets carried in the link status detection information a is 1. The link status detection information b carries a quantity of service data packets between the reference time and the link status detection information b, that is, the quantity of the service data packets carried in the link status detection information b is 3. The link status detection information c carries a quantity of service data packets between the reference time and the link status detection information c, that is, the quantity of the service data packets carried in the link status detection information c is 5. The link status detection information d carries a quantity of service data packets between the reference time and the link status detection information d, that is, the quantity of the service data packets carried in the link status detection information d is 8.

For this example, a quantity of service data packets carried in one piece of link status detection information is a quantity of service data packets sent between the link status detection information and the reference time.

For this example, the second device may calculate a packet loss rate of service data packets between adjacent link status detection information. For example, assuming that the service data packets 3 and 7 are lost, that is, the second device does not receive the service data packets 3 and 7, the second device may obtain through calculation: a packet loss rate of the service data packets between the reference time and the link status detection information a is 0%; a packet loss rate of the service data packets between the reference time and the link status detection information b is 33.3%; a packet loss rate of the service data packets between the reference time and the link status detection information c is 20%; and a packet loss rate of the service data packets between the reference time and the link status detection information d is 25%.

Alternatively, the second device may also calculate, based on a quantity of service data packets carried in each piece of link status detection information, a quantity of service data packets sent between two adjacent pieces of link status detection information, so as to calculate a packet loss rate of service data packets between any two adjacent pieces of link status detection information.

Whether the second device calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

In an implementation method, before step 301, the first device further sends the second link status detection information to the second device by using the link, and after step 301, the first device further sends third link status detection information to the second device by using the link. The third link status detection information indicates the first quantity and a second quantity. The first quantity refers to a quantity of service data packets sent by the first device to the second device on the link within the time when the first device sends the second link status detection information and the first device sends the first link status detection information. The second quantity refers to a quantity of service data packets sent by the first device to the second device on the link within a time when the first device sends the first link status detection information and the first device sends the third link status detection information. In this case, step 302 may be specifically: The second device obtains, based on the first link status detection information, a packet loss rate of service data packets on the link within a time when the first device sends the second link status detection information and the first device sends the third link status detection information; and/or the second device obtains, based on the first link status detection information, a packet loss rate of the service data packets on the link within the time when the first device sends the first link status detection information and the first device sends the third link status detection information. The second link status detection information and the first link status detection information may be two adjacent pieces of link status detection information, or may be two non-adjacent pieces of link status detection information.

The following describes this solution with reference to a specific example.

Figure 4D:
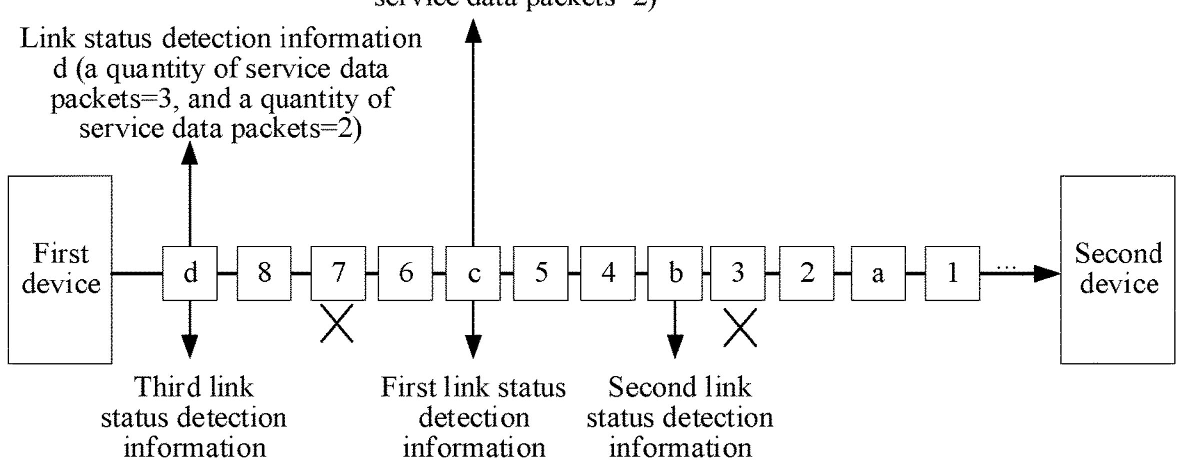

FIG. 4D is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which the first link status detection information is the link status detection information c is used. The second link status detection information is the link status detection information b, and the third link status detection information is the link status detection information d.

The link status detection information c carries a quantity 2 of service data packets between the link status detection information b and the link status detection information c, and a quantity 2 of service data packets between the link status detection information a and the link status detection information b. The link status detection information d carries a quantity 3 of service data packets between the link status detection information c and the link status detection information d, and a quantity 2 of service data packets between the link status detection information b and the link status detection information c.

For this example, one piece of link status detection information may carry one or more quantities of service data packets. For example, in the foregoing example, two quantities of service data packets are carried, and certainly, three quantities or four quantities may also be carried. Certainly, initial link status detection information may carry one quantity of service data packets.

For this example, the second device may calculate a packet loss rate of service data packets between adjacent link status detection information. For example, assuming that the service data packets 3 and 7 are lost, that is, the second device does not receive the service data packets 3 and 7, the second device may obtain through calculation: a packet loss rate of the service data packets between the link status detection information a and the link status detection information b is 50%; a packet loss rate of the service data packets between the link status detection information b and the link status detection information c is 0%; and a packet loss rate of the service data packets between the link status detection information c and the link status detection information d is 33.3%.

Certainly, the second device may further obtain through calculation: a packet loss rate of the service data packets between the link status detection information a and the link status detection information c is 25%; a packet loss rate of the service data packets between the link status detection information a and the link status detection information d is 28.6%; and a packet loss rate of the service data packets between the link status detection information b and the link status detection information d is 20%.

Whether the second device calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

It should be noted that in the foregoing implementation solution, two quantities of service data packets are carried in one piece of link status information. In an actual application, three or more quantities of service data packets may be carried in one piece of link status detection information. In this embodiment, it is not limited that the link status detection information carries quantity information of the service data packets.

An advantage of carrying a plurality of quantities of service data packets in one piece of link status detection information lies in that: an impact brought by the link status detection information can be reduced, thereby improving accuracy and a speed of detecting the packet loss rate of the service data packets. FIG. 4D is used as an example. When the link status detection information b is lost, the second device cannot learn the quantity of the service data packets sent between the link status detection information a and the link status detection information b, but after receiving the link status detection information c, the second device may learn the quantity of the service data packets sent between the link status detection information a and the link status detection information b, thereby eliminating an impact caused by a loss of the link status detection information b.

In an implementation method, the first link status detection information in step 301 specifically indicates the first device to send a default quantity of service data packets to the second device on the link. Optionally, the default quantity may be pre-configured on the first device and the second device, or may be predefined in a protocol, or may be notified to the second device after the first device determines the default quantity. For example, indication information is sent to the second device to indicate a value of the default quantity.

It should be noted that the default quantity may be dynamically updated. For example, the second device may dynamically notify the first device of a latest default quantity, or another network element such as an SMF or a PCF may dynamically notify the first device of a latest default quantity.

The following describes this solution with reference to a specific example.

Figure 4E:
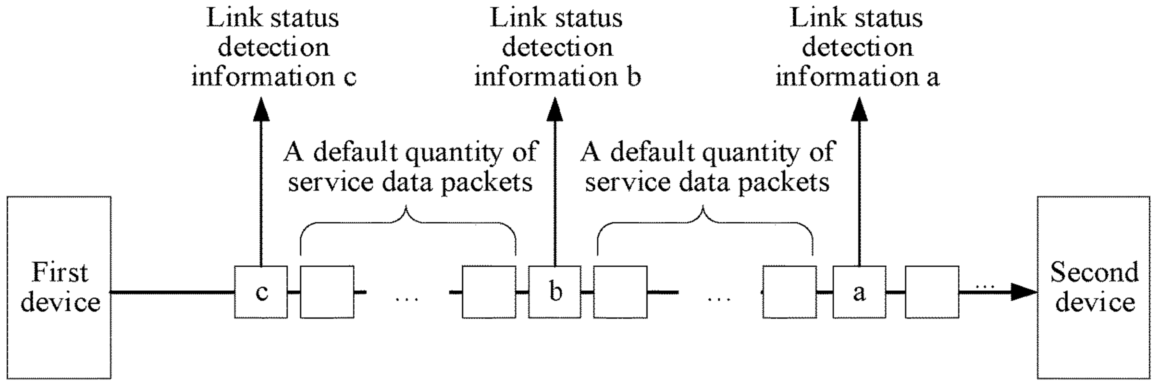

FIG. 4E is a diagram of an example of transmission of link status detection information and service data packets. In this example, a plurality of service data packets are sequentially transmitted on one link, and one piece of link status detection information is sent at intervals of a specific quantity. An example in which the default quantity is 100 is used. Each time 100 service data packets are sent, one piece of link status detection information is sent. Therefore, 100 service data packets are sent between the link status detection information a and the link status detection information b, 100 service data packets are sent between the link status detection information b and the link status detection information c, and so on. In addition, the link status detection information does not need to carry a quantity of sent service data packets.

For this example, the second device may calculate a packet loss rate of service data packets between adjacent link status detection information. For example, assuming that three service data packets are lost between the link status detection information a and the link status detection information b, and four service data packets are lost between the link status detection information b and the link status detection information c, the second device may obtain through calculation: a packet loss rate of the service data packets between the link status detection information a and the link status detection information b is 3%; and a packet loss rate of the service data packets between the link status detection information b and the link status detection information c is 4%.

Certainly, the second device may further obtain through calculation: a packet loss rate of the service data packets between the link status detection information a and the link status detection information c is 3.5%.

Whether the second device calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

In an implementation method, before step 301, the first device further sends the second link status detection information to the second device by using the link, and after step 301, the first device further sends fourth link status detection information to the second device by using the link. The fourth link status detection information indicates a fourth quantity of service data packets sent by the first device to the second device on the link within a time when the first device sends the first link status detection information and the first device sends the fourth link status detection information. In this case, step 302 may be specifically: The second device obtains, based on the first link status detection information and the fourth link status detection information, a packet loss rate of service data packets within a time when the first device sends the second link status detection information and the first device sends the fourth link status detection information. The second link status detection information and the first link status detection information may be two adjacent pieces of link status detection information, or may be two non-adjacent pieces of link status detection information.

The following describes this solution with reference to a specific example.

Figure 4F:
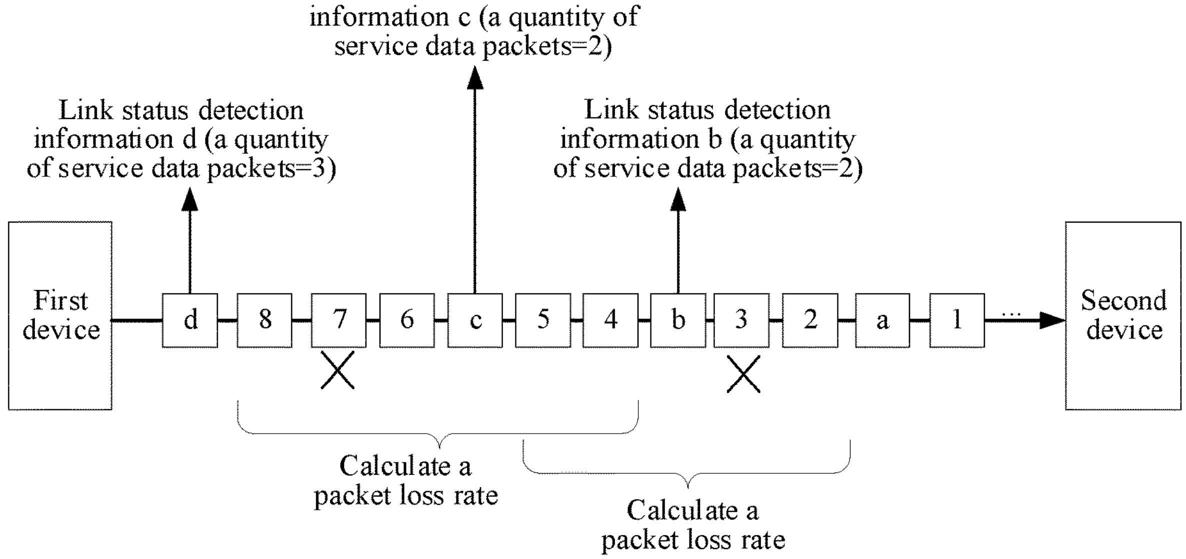

FIG. 4F is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which the first link status detection information is the link status detection information c is used. The second link status detection information is the link status detection information b, and the fourth link status detection information is the link status detection information d. An example in which the first link status detection information is the link status detection information b is used. The second link status detection information is the link status detection information a, and the fourth link status detection information is the link status detection information c.

The link status detection information c carries a quantity 4 of service data packets between the link status detection information a and the link status detection information c. The link status detection information d carries a quantity 5 of service data packets between the link status detection information b and the link status detection information d.

For this example, the second device may calculate a packet loss rate of service data packets between link status detection information. For example, assuming that the service data packets 3 and 7 are lost, that is, the second device does not receive the service data packets 3 and 7, the second device may obtain through calculation: a packet loss rate of the service data packets between the link status detection information a and the link status detection information c is 25%; and a packet loss rate of the service data packets between the link status detection information b and the link status detection information d is 20%.

Certainly, the second device may further obtain through calculation:

a packet loss rate of the service data packets between the link status detection information a and the link status detection information b is 50%; a packet loss rate of the service data packets between the link status detection information b and the link status detection information c is 0%; a packet loss rate of the service data packets between the link status detection information c and the link status detection information d is 33.3%; and a packet loss rate of the service data packets between the link status detection information a and the link status detection information d is 28.6%.

Whether the second device calculates a packet loss rate of service data packets between two adjacent pieces of link status detection information or calculates a packet loss rate of service data packets between two non-adjacent pieces of link status detection information depends on a specific implementation. This is not limited in this embodiment. In an implementation method, the second device may determine, based on a configured parameter such as a packet loss rate detection cycle and a packet loss rate detection frequency, a time point for calculating the packet loss rate of the service data packets.

Figure 4G:
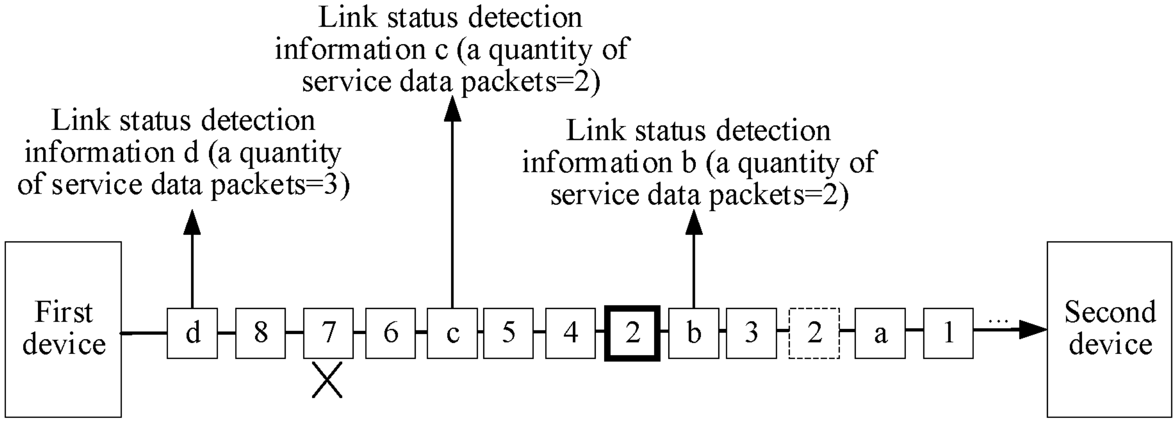

It should be noted that, in the foregoing example, when the second device calculates a packet loss rate of service data packets between two adjacent pieces of link status detection information, the packet loss rate of the service data packets may be calculated in time, so that the first device, the second device, or another device makes a quick decision based on the packet loss rate. When the second device calculates a packet loss rate of service data packets between two non-adjacent pieces of link status detection information, that is, when receiving three or more pieces of link status detection information, the second device calculates the packet loss rate of the service data packets once, so that an impact caused by disorder of the service data packets can be reduced, and accuracy of calculating the packet loss rate of the service data packets is improved. For example, FIG. 4G is a diagram of an example of transmission of link status detection information and service data packets. In this example, the first device sequentially sends service data packets 1 to 8 to the second device. A sequence in which the second device first receives the service data packets is: the service data packet 1, the service data packet 3, the service data packet 2, the service data packet 4, the service data packet 5, the service data packet 6, the service data packet 7, and the service data packet 8. An example in which the service data packet 7 is lost, and other service data packets are all received by the second device is used. If the second device calculates a packet loss rate of service data packets between two adjacent pieces of link status detection information, a calculated packet loss rate of the service data packets sent between the link status detection information a and the link status detection information b is 50%, but actually, the service data packet 2 is not lost. Therefore, the packet loss rate of the service data packets sent between the link status detection information a and the link status detection information b should be 0%. If the second device calculates a packet loss rate of service data packets between two non-adjacent pieces of link status detection information, for example, obtains through calculation that a packet loss rate of the service data packets sent between the link status detection information a and the link status detection information c is 0%, which is an actual packet loss rate. Therefore, when the second device calculates a packet loss rate of service data packets between two non-adjacent pieces of link status detection information, an impact caused by disorder of the service data packets may be reduced, and accuracy of calculating the packet loss rate of the service data packets is improved.

Figure 5:
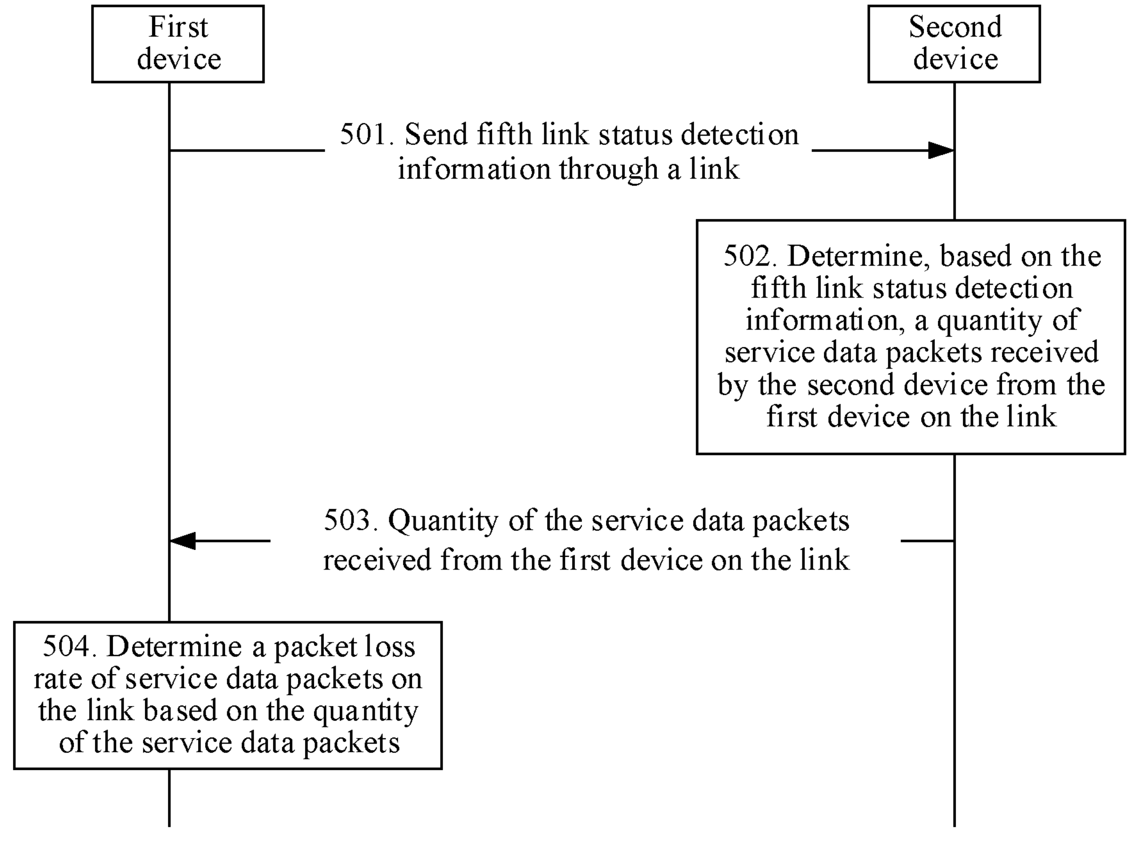
FIG. 5 is a schematic diagram of a packet loss rate detection method according to an embodiment.

FIG. 5 is a schematic diagram of a packet loss rate detection method according to an embodiment. The method includes the following steps.

Step 501: A first device sends fifth link status detection information to a second device through a link. Correspondingly, the second device receives the fifth link status detection information.

Step 502: The second device determines, based on the fifth link status detection information, a quantity of service data packets received by the second device from the first device on the link.

Some service data packets may be lost in a sending process. Therefore, the quantity of the service data packets received by the second device from the first device on the link may be less than a quantity of service data packets sent by the first device to the second device on the link.

Step 503: The second device sends, to the first device, the quantity of the service data packets received by the second device from the first device on the link. Correspondingly, the first device receives the quantity of the service data packets received by the second device from the first device on the link.

Step 504: The first device determines a packet loss rate of service data packets on the link based on the quantity of the service data packets.

For example, the first device and the second device may calculate, based on the quantity of the service data packets sent by the first device to the second device on the link and the quantity of the service data packets received by the second device from the first device on the link, the packet loss rate of the service data packets on the link based on a ratio of the two quantities.

Based on the foregoing solution, the second device may notify, by using link status detection information, the first device of the quantity of the service data packets received by the second device from the first device on the link, so that the first device may quickly calculate the packet loss rate of the service data packets based on the quantity of the service data packets received by the second device from the first device on the link. In addition, because there is no need to parse the service data packets and determine whether the service data packets are lost, a calculation speed of the packet loss rate may be improved.

In an implementation method, before step 501, the first device further sends sixth link status detection information to the second device by using the link. Correspondingly, the second device receives the sixth link status detection information, and step 502 may be specifically: The second device determines a quantity (referred to as a fifth quantity hereinafter) of service data packets received by the second device from the first device on the link within a time when the first device sends the sixth link status detection information and the first device sends the fifth link status detection information. Step 504 may be specifically: The first device determines a packet loss rate of service data packets on the link based on the fifth quantity and a sixth quantity. The sixth quantity refers to a quantity of service data packets sent by the first device to the second device on the link within the time when the first device sends the sixth link status detection information and the first device sends the fifth link status detection information.

Optionally, the first device further sends, to the second device, time information corresponding to the determined quantity of the service data packets, where the time information includes a time period between that the first device sends the sixth link status detection information and that the first device sends the fifth link status detection information. Optionally, the fifth link status detection information and the sixth link status detection information are link status detection data packets, and the time information includes sequence number information corresponding to the link status detection data packets.

The sixth link status detection information and the fifth link status detection information may be two adjacent pieces of link status detection information, or may be two non-adjacent pieces of link status detection information.

The following describes this solution with reference to a specific example.

Figure 6:
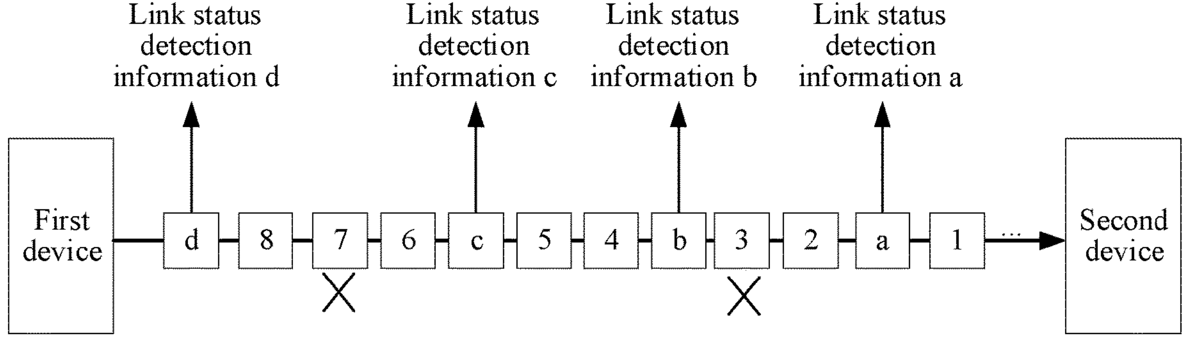
FIG. 6 is a diagram of an example of transmission of link status detection information and service data packets according to an embodiment.

FIG. 6 is a diagram of an example of transmission of link status detection information and service data packets. In this example, a service data packet 1 to a service data packet 8 are sequentially transmitted on one link. In addition, link status detection information a is sent after the service data packet 1, link status detection information b is sent after the service data packet 3, link status detection information c is sent after the service data packet 5, and link status detection information d is sent after the service data packet 8. An example in which the fifth link status detection information and the sixth link status detection information are two adjacent pieces of link status detection information is used. When the fifth link status detection information is the link status detection information d, the sixth link status detection information is the link status detection information c; when the fifth link status detection information is the link status detection information c, the sixth link status detection information is the link status detection information b; and when the fifth link status detection information is the link status detection information b, the sixth link status detection information is the link status detection information a.

For example, assuming that the service data packets 3 and 7 are lost, that is, the second device does not receive the service data packets 3 and 7, the second device may send the following information to the first device: a quantity of service data packets received between the link status detection information a and the link status detection information b is: 1; a quantity of service data packets received between the link status detection information b and the link status detection information c is: 2; and a quantity of service data packets received between the link status detection information c and the link status detection information d is: 2.

Alternatively, the second device may send the following information to the first device: a quantity of service data packets received between the link status detection information a and the link status detection information c is: 3; a quantity of service data packets received between the link status detection information a and the link status detection information d is: 5; and a quantity of service data packets received between the link status detection information b and the link status detection information d is: 4.

Whether the second device specifically sends a quantity of service data packets received between two adjacent pieces of link status detection information to the first device or sends a quantity of service data packets received between two non-adjacent pieces of link status detection information to the first device depends on a specific implementation. This is not limited in this embodiment.

The first device may obtain through calculation: a packet loss rate of the service data packets between the link status detection information a and the link status detection information b is 50%; a packet loss rate of the service data packets between the link status detection information b and the link status detection information c is 0%; and a packet loss rate of the service data packets between the link status detection information c and the link status detection information d is 33.3%.

Certainly, the first device may further obtain through calculation: a packet loss rate of the service data packets between the link status detection information a and the link status detection information c is 25%; a packet loss rate of the service data packets between the link status detection information a and the link status detection information d is 28.6%; and a packet loss rate of the service data packets between the link status detection information b and the link status detection information d is 20%.

In an implementation method, for any implementation solution in FIG. 3 or FIG. 5, for each piece of link status detection information sent by the first device, after receiving the link status detection information, the second device sends response information for the link status detection information to the first device, where the response information may also be one piece of link status detection information. For example, for any implementation solution corresponding to FIG. 3, after obtaining the packet loss rate of the service data packets through calculation, the second device may add the packet loss rate of the service data packets to the response information. For another example, for any implementation solution corresponding to FIG. 5, the second device adds the quantity of the received service data packets to the response information.

In an implementation method, for any implementation solution in FIG. 3 or FIG. 5, when sending the link status detection information to the second device, the first device may add identification information to the link status detection information, where the identification information may include a procedure transport identifier (PTI), or include a procedure transport identifier and a sequence number.

For example, when the identification information carried in the link status detection information sent by the first device to the second device includes a PTI, the response information sent by the second device to the first device for the link status detection information also carries the procedure transport identifier. In this solution, a function of the procedure transport identifier is as follows: First, the procedure transport identifier is used for identifying the link status detection information, that is, used for distinguishing different link status detection information; second, the procedure transport identifier is used for sorting different link status detection information; and third, the procedure transport identifier is used for associating the link status detection information with the response information for the link status detection information. For example, the link status detection information sent by the first device to the second device is sequentially: link status detection information 1 (PTI-1), link status detection information 2 (PTI-2), link status detection information 3 (PTI-3), and link status detection information 4 (PTI-4), and the response information sent by the second device is sequentially: link status detection information 1' (PTI-1), link status detection information 2' (PTI-2), link status detection information 3' (PTI-3), and link status detection information 4' (PTI-4). For example, if the second device does not receive the link status detection information 2, the second device may infer, based on PTI-1, PTI-3, and PTI-4, that the link status detection information 2 corresponding to PTI-2 is not received.

For another example, when the identification information carried in the link status detection information sent by the first device to the second device includes a PTI and a sequence number, the response information sent by the second device to the first device for the link status detection information also carries the procedure transport identifier and a sequence number. The procedure transport identifier in the link status detection information sent by the first device and the procedure transport identifier in the received response information for the link status detection information may be the same or different, and the sequence number in the link status detection information sent by the first device and the sequence number in the received response information for the link status detection information may be the same or different. In this solution, a function of the procedure transport identifier is as follows: First, the procedure transport identifier is used for identifying the link status detection information, that is, used for distinguishing different link status detection information; and second, the procedure transport identifier is used for associating the link status detection information with the response information for the link status detection information. The sequence number is used for sorting different link status detection information. For example, the link status detection information sent by the first device to the second device is sequentially: link status detection information 1 (PTI-a, SN-1), link status detection information 2 (PTI-b, SN-2), link status detection information 3 (PTI-c, SN-3), and link status detection information 4 (PTI-d, SN-4), and the response information sent by the second device to the first device for the received link status detection information is sequentially: link status detection information 1' (PTI-a, SN-1'), link status detection information 2' (PTI-b, SN-2'), link status detection information 3' (PTI-c, SN-3'), and link status detection information 4' (PTI-d, SN-4'). SN-1 and SN-1' may be the same or different, SN-2 and SN-2' may be the same or different, SN-3 and SN-3' may be the same or different, and SN-4 and SN-4' may be the same or different. Optionally, the response information sent by the second device to the first device for the received link status detection information may alternatively not carry a sequence number. For example, in the foregoing example, SN-1', SN-2', SN-3', and SN-4' are not carried. For example, if the second device does not receive the link status detection information 2, the second device may infer, based on SN-1, SN-3, and SN-4, that the link status detection information 2 corresponding to PTI-2 is not received.

In an implementation method, when calculating the packet loss rate of the service data packets, the first device or the second device may consider a loss situation of the link status detection information, or certainly may not consider a loss situation of the link status detection information. After sending the link status detection information, the first device may determine, based on whether response information for the link status detection information is received, whether the sent link status detection information is lost. The second device may determine, based on identification information (which may include a procedure transport identifier, or include a procedure transport identifier and a sequence number) in a plurality of pieces of received link status detection information, whether one or more pieces of link status detection information are lost.

Optionally, in this embodiment, the link status detection information may be a link status detection data packet. When sending the link status detection data packet, the first device may add a PMF request message to the link status detection data packet. The PMF request message carries identification information (which may include a procedure transport identifier, or may include a procedure transport identifier and a sequence number). Optionally, the PMF request message may further carry a quantity indicating sent service data packets. For a specific implementation, refer to descriptions in the foregoing embodiments. After receiving the link status detection data packet, the second device sends response information for the link status detection information to the first device, where the response information is also a link status detection data packet, the link status detection data packet carries a PMF response message, and a procedure transport identifier carried in the PMF response message is the same as the procedure transport identifier carried in the PMF request message, so that the first device may identify a correspondence between the received link status detection information and the sent link status detection information. Optionally, the PMF response message carries a quantity of service data packets received by the second device from the first device or a packet loss rate of the service data packets. For a specific implementation, refer to descriptions in the foregoing embodiments.

In an implementation method, when the UE or the UPF calculates a packet loss rate of a QoS flow, a PMF of the UE or the UPF may determine an identifier (that is, a QFI) of a QoS flow to which service data packets belong, that is, determine a QoS flow to which sent or received service data packets belong, and then count or calculate a packet loss rate of the service data packets of the corresponding QoS flow. For example:

For a downlink service flow, after receiving a downlink service data packet on a link, an access chip of the UE sends the downlink service data packet to the PMF of the UE. The PMF determines, based on a QoS policy (that is, a QoS rule), a QFI of a QoS flow to which the downlink service data packet belongs. The foregoing QoS rule is the same as that in the current technology, and includes a correspondence between SDF description information and a QFI. Alternatively, after receiving a downlink service data packet on a link, an access chip of the UE parses a Service Data Adaptation Protocol (SDAP) layer of the downlink service data packet, obtains a QFI carried in the SDAP layer, and sends the QFI to the PMF. Optionally, when packet loss rates of different links corresponding to different access technologies need to be calculated, the access chip of the UE sends an access technology indication corresponding to a transmission link of each downlink service data packet to the PMF of the UE.

For a downlink service flow, after the UPF receives a downlink service data packet, the PMF determines a QFI corresponding to the downlink service data packet based on a policy (for example, a QoS enforcement rule (QER)) received on the N4 interface, and counts downlink data packets corresponding to the QFI when sending the downlink service data packet to the UE.

For an uplink service flow, after the PMF of the UE receives service data packets generated by an upper-layer application, the PMF determines a QFI corresponding to the service data packets based on a QoS rule and counts the service data packets corresponding to the QFI.

For an uplink service flow, after receiving an uplink service data packet on a link, the UPF sends the uplink data packet to the PMF of the UPF, and the PMF determines, based on a policy (for example, a QER) received on the N4 interface, a QFI to which the uplink service data packet belongs. Alternatively, after receiving an uplink service data packet on a link, the UPF obtains a QFI carried in a GPRS Tunnelling Protocol user data (GTP-U) layer of the service data packet, and sends the QFI to the PMF of the UPF.

In an implementation method, when the UE or the UPF calculates a packet loss rate of at least one QoS flow, the UE may obtain, based on the current technology, data radio bearer (DRB) information corresponding to the QoS flow. That is, at least one QoS flow on an air interface side is aggregated to one DRB link. The access chip of the UE sends a correspondence between the DRB and the QFI(s) to the PMF of the UE. The PMF of the UE counts a quantity of downlink service packets received on a DRB link and calculates a packet loss rate at a DRB granularity. In addition, the UE may send, to the UPF, at least one piece of QoS flow information aggregated to one DRB, for example, a QFI(s), and the UPF may calculate a quantity or a packet loss rate of service data packets sent or received on the plurality of QoS flows. For a method that the UPF or the UE determines the QoS flow to which the service data packet belongs, refer to the foregoing descriptions.

Figure 7:
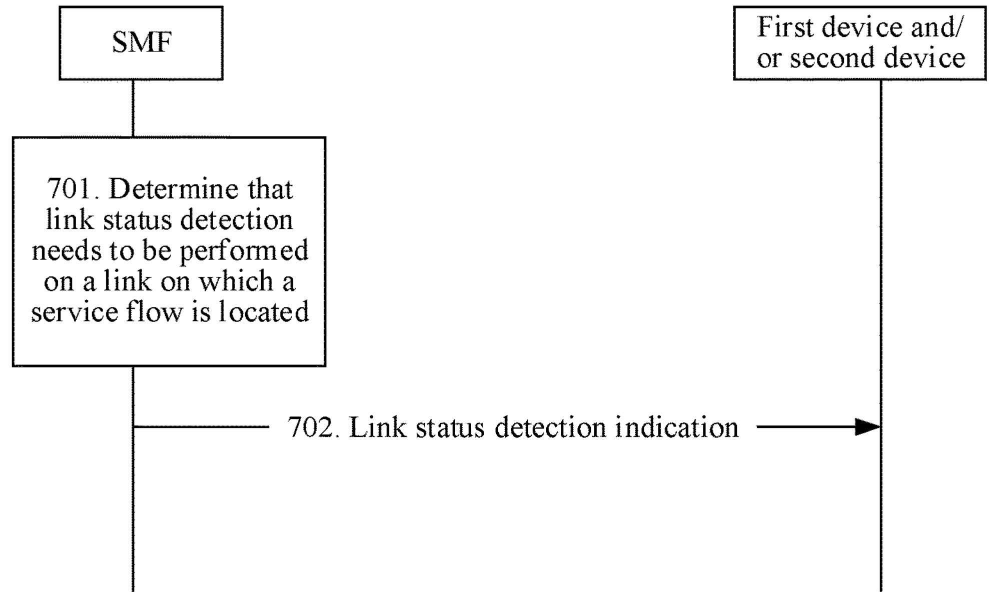
FIG. 7 is a schematic diagram of a packet loss rate detection method according to an embodiment.

FIG. 7 is a schematic diagram of a packet loss rate detection method according to an embodiment. The method may be implemented in combination with the embodiment corresponding to FIG. 3 and/or the embodiment corresponding to FIG. 5, or may be implemented in combination with another embodiment, or may be implemented separately. This is not limited in this disclosure. It should be noted that, in the following descriptions, the first device serves as a sender of a service data packet, and the second device serves as a recipient of the service data packet.

The method includes the following steps.

Step 701: An SMF determines that link status detection needs to be performed on a link on which a service flow is located.

Alternatively, it is understood that the SMF determines that link status detection needs to be performed on the service flow.

In an implementation method, when the service flow includes at least one QoS flow, and the QoS flow includes at least one SDF, or the service flow includes an SDF, the SMF may determine, according to any one of the following methods, that link status detection needs to be performed on the link on which the service flow is located:

Method 1: When determining that a steering function of the SDF in the service flow is ATSSS-LL, the SMF determines that link status detection needs to be performed on the link on which the service flow is located.

Method 2: When determining that a steering function of the SDF in the service flow is ATSSS-LL and a steering mode of the SDF is a load-balancing mode, the SMF determines that link status detection needs to be performed on the link on which the service flow is located.

Method 3: When determining that a steering function of the SDF in the service flow is ATSSS-LL and a steering mode of the SDF is a smallest delay mode, the SMF determines that link status detection needs to be performed on the link on which the service flow is located.

Method 4: When determining that a steering function of the SDF in the service flow is ATSSS-LL and a steering mode of the SDF is a priority-based mode, the SMF determines that link status detection needs to be performed on the link on which the service flow is located.

Method 5: When determining that a steering function of the SDF in the service flow is ATSSS-LL and a steering mode of the SDF is an active-standby mode, the SMF determines that link status detection needs to be performed on the link on which the service flow is located.

Method 6: When determining that a link status threshold of the service flow is received from a PCF, the SMF determines that link status detection needs to be performed on the link on which the service flow is located, where the link status threshold includes a packet loss rate threshold.

Step 702: The SMF sends a link status detection indication to the first device and/or the second device. Correspondingly, the first device and/or the second device receives the link status detection indication.

The link status detection indication is for enabling a link status detection function, and the link status detection function includes a packet loss rate detection function. The "enabling a link status detection function" herein may be understood as an indication to enable the link status detection function.

Based on the foregoing solution, the SMF may send the link status detection indication to the first device and/or the second device, to enable a link status detection function of the first device and/or the second device. Therefore, the first device and/or the second device may quickly and accurately detect a packet loss rate of service data packets on the link based on the enabled link status detection function.

In an implementation method, the SMF may further send identification information of the service flow to the first device and/or the second device, where the identification information includes a PDU session identifier, SDF description information, IP quintuple information, Ethernet flow description information, or at least one QFI. The link status detection indication in step 702 is specifically for enabling a link status detection function for the service flow.

In an implementation method, the SMF may allocate a corresponding IP address and/or port number to the link status detection function, and then the SMF configures the IP address and/or the port number for the first device and/or the second device. For example, the link status detection indication includes an IP address and/or a port number. Optionally, when the IP address and/or the port number are/is configured at a QoS granularity, the SMF further sends, to the first device and/or the second device, a QFI corresponding to the IP address and/or the port number, to indicate to allocate the IP address and/or the port number to a link status detection function of a QoS flow indicated by the QFI.

In another implementation method, the first device (or the second device) may allocate a corresponding IP address and/or port number to the link status detection function, and then send the IP address and/or the port number to the SMF, and the SMF then configures the IP address and/or the port number for the second device (or the first device). Optionally, when the IP address and/or the port number are/is configured at a QoS granularity, the first device (or the second device) further sends, to the SMF, a QFI corresponding to the IP address and/or the port number, and then the SMF further sends the QFI to the second device (or the first device), to indicate to allocate the IP address and/or the port number to a link status detection function of a QoS flow indicated by the QFI.

In an implementation method, the SMF may further send a counting indication to the first device, where the counting indication indicates the first device to count a quantity of service data packets sent by the first device to the second device on the link. For example, the first device may carry the quantity of the sent service data packets in sent link status detection information (for example, one or more of the first link status detection information, the second link status detection information, the third link status detection information, the fourth link status detection information, the fifth link status detection information, or the sixth link status detection information in the foregoing examples).

In an implementation method, the SMF may further send a counting indication to the second device, where the counting indication indicates the second device to count a quantity of service data packets sent by the first device to the second device on the link, or the counting indication indicates the second device to stop counting, when receiving link status detection information, a quantity of service data packets received on the link, reset a counter, and store or send the quantity of the service data packets received on the link to the first device, or the counting indication indicates the second device to calculate, when receiving link status detection information, a quantity of service data packets received on the link, and store or send the quantity of the service data packets received on the link to the first device.

In an implementation method, the SMF may further send a link status reporting indication to the first device and/or the second device, where the link status reporting indication indicates to report the packet loss rate of the service data packets. Alternatively, the SMF sends a link status reporting frequency to the first device and/or the second device, where the link status reporting frequency indicates a frequency of reporting the packet loss rate of the service data packets. Alternatively, the SMF sends a link status reporting cycle to the first device and/or the second device, where the link status reporting cycle indicates a cycle of reporting the packet loss rate of the service data packets. Therefore, the first device and/or the second device may report the detected packet loss rate of the service data packets to the SMF, the PCF, or another network element based on the link status reporting indication, the link status reporting frequency, or the link status reporting cycle.

In an implementation method, when the first device calculates the packet loss rate of the service data packets, the SMF may further send a packet loss rate detection indication to the first device. The packet loss rate detection indication indicates the first device to calculate, when receiving, from the second device, a quantity of received service data packets that is counted by the second device, the packet loss rate of the service data packets.

In an implementation method, when the second device calculates the packet loss rate of the service data packets, the SMF may further send a packet loss rate detection indication to the second device, where the packet loss rate detection indication indicates the second device to calculate the packet loss rate of the service data packets when receiving link status detection information. Alternatively, the packet loss rate detection indication indicates the second device to calculate a quantity of service data packets received on the link when receiving link status detection information, and calculate the packet loss rate of the service data packets by using the quantity of the service data packets received on the link. Alternatively, the packet loss rate detection indication indicates the second device to: when receiving link status detection information, stop counting a quantity of service data packets received on the link, reset a counter, and calculate the packet loss rate of the service data packets by using the counted quantity of the service data packets received on the link.

Figure 8:
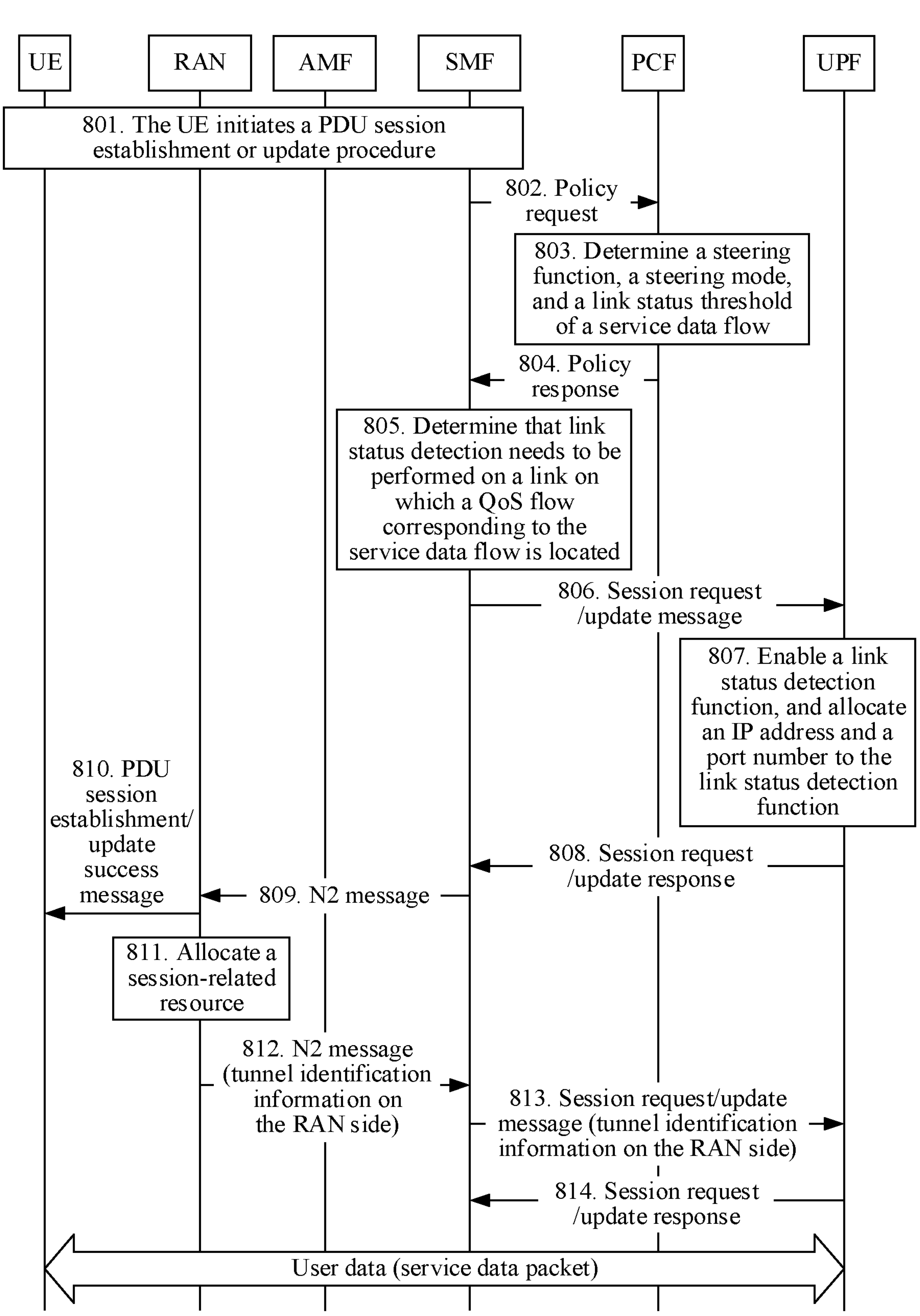
FIG. 8 is a schematic diagram of a packet loss rate detection method according to an embodiment.

To facilitate understanding of content of embodiments, the following describes the configuration process shown in FIG. 7 with reference to a specific example. FIG. 8 is a schematic diagram of a packet loss rate detection method according to an embodiment. In this embodiment, an example in which a packet loss rate at a QoS granularity is calculated is used for description.

The method includes the following steps.

Step 801: The UE initiates a PDU session establishment or update procedure.

For example, when the UE initiates a PDU session establishment procedure, the UE sends a non-access stratum (NAS) message to the AMF by using the RAN, where the NAS message includes a PDU session establishment request message. After receiving the NAS message, the AMF forwards the PDU session establishment request message to the SMF.

For another example, when the UE initiates a PDU session update procedure, the UE sends a NAS message to the AMF by using the RAN. The NAS message includes a PDU session modification request message. After receiving the NAS message, the AMF forwards the PDU session modification request message to the SMF.

Step 802: The SMF sends a policy request to the PCF. Correspondingly, the PCF receives the policy request.

Step 803: The PCF determines a steering function, a steering mode, and a link status threshold of an SDF.

The determined steering function may be, for example, at least one of ATSSS-LL or MPTCP.

The determined steering mode may be, for example, one of a smallest delay mode, a load-balancing mode, an active-standby mode, or a priority-based mode.

The link status threshold includes a maximum packet loss rate, and optionally, further includes a maximum RTT.

Step 804: The PCF sends a policy response to the SMF, where the policy response carries SDF description information, the steering mode, the steering function, and the link status threshold. Correspondingly, the SMF receives the policy response.

The SDF description information is for matching the SDF.

Optionally, the PCF further sends a link status detection frequency or a link status detection cycle to the SMF. The link status detection frequency indicates a frequency of detecting a link status, for example, 5 times/minute. That is, detection is performed 5 times per minute. The link status detection cycle indicates a cycle of detecting a link status, for example, 5 seconds. That is, detection is performed every 5 seconds.

Optionally, the PCF further sends a link status reporting indication, a link status reporting frequency, or a link status reporting cycle to the SMF. The link status reporting indication indicates to report link status information. The link status reporting frequency indicates a frequency of reporting link status information, for example, 2 times/minute. That is, reporting is performed 2 times per minute. The link status reporting cycle indicates a cycle of reporting link status information, for example, 10 seconds. That is, reporting is performed once every 10 seconds. The link status information includes a packet loss rate. Optionally, the link status information further includes a delay, a bandwidth, and the like.

Step 805: The SMF determines that link status detection needs to be performed on a link on which a QoS flow corresponding to the SDF is located.

The SMF may determine, based on at least one of the steering function, the steering mode, or the link status threshold of the SDF, that link status detection needs to be performed on a link on which a QoS flow corresponding to the SDF is located.

For example, when the steering function of the SDF received by the SMF is ATSSS-LL, the SMF determines that link status detection needs to be performed on the link on which the QoS flow corresponding to the SDF is located.

For another example, when the steering function of the SDF received by the SMF is ATSSS-LL and the steering mode is one of a load-balancing mode, a priority-based mode, an active-standby mode, or a smallest delay mode, the SMF determines that link status detection needs to be performed on the link on which the QoS flow corresponding to the SDF is located.

For another example, when the SMF determines that the link status threshold of the SDF is received, the SMF determines that link status detection needs to be performed on the link on which the QoS flow corresponding to the SDF is located.

Step 806: The SMF sends a session request/update message to the UPF, where the session request/update message carries a link status detection indication and a QFI. Correspondingly, the UPF receives the session request/update message.

When a session request message is sent, the session request message may be, for example, a Packet Forwarding Control Protocol (PFCP) session request message. When a session update message is sent, the session update message may be, for example, a PFCP session update message.

The link status detection indication is for enabling a link status detection function on the QoS flow. That is, link status detection is performed based on a QoS granularity. In a specific implementation, the link status detection indication may include a PMF enabling indication or a packet loss rate detection indication. The PMF enabling indication is for enabling a PMF-based link status detection function of the UPF, and the packet loss rate detection indication is for enabling a packet loss rate detection function of the UPF. Optionally, the link status detection indication further includes one or more of an RTT detection indication, a jitter detection indication, and a bandwidth detection indication. The RTT detection indication is for enabling the UPF to perform RTT detection, the jitter detection indication is for enabling the UPF to perform jitter detection, and the bandwidth detection indication is for enabling a bandwidth detection function.

Optionally, the SMF may further allocate an IP address and a port number to the link status detection function performed on the UPF, and send the IP address and the port number to the UPF by using the session request/update message. The IP address and the port number are allocated based on a QoS flow granularity. In this case, a plurality of IP addresses and a plurality of port numbers may be allocated, and one IP address corresponds to one port number.

Optionally, the SMF may further determine a link status detection frequency or a link status detection cycle at the QoS flow granularity, and send the link status detection frequency or the link status detection cycle to the UPF by using the session request/update message. It should be noted that, if the link status detection frequency or the link status detection cycle is carried in step 804, the link status detection frequency or the link status detection cycle determined by the SMF may be determined based on the link status detection frequency or the link status detection cycle received in step 804, or may be determined by the SMF based on a local policy. If the link status detection frequency or the link status detection cycle is not carried in step 804, the link status detection frequency or the link status detection cycle determined by the SMF may be determined by the SMF based on a local policy.

Optionally, the SMF may further determine a link status reporting indication, a link status reporting frequency, or a link status reporting cycle at the QoS flow granularity, and send the link status reporting indication, the link status reporting frequency, or the link status reporting cycle to the UPF by using the session request/update message. It should be noted that, if the link status reporting indication, the link status reporting frequency, or the link status reporting cycle is carried in step 804, the link status reporting indication, the link status reporting frequency, or the link status reporting cycle determined by the SMF may be determined based on the link status reporting indication, the link status reporting frequency, or the link status reporting cycle received in step 804, or may be determined by the SMF based on a local policy. If the link status reporting indication, the link status reporting frequency, or the link status reporting cycle is not carried in step 804, the link status reporting indication, the link status reporting frequency, or the link status reporting cycle determined by the SMF may be determined by the SMF based on a local policy.

Step 807: The UPF enables a link status detection function based on the received link status detection indication, and allocates an IP address and a port number to the link status detection function.

It should be noted that if the IP address and the port number are carried in step 806, the UPF uses the received IP address and the received port number as the IP address and the port number of the link status detection function. The UPF receives an IP address and a port number at a QoS flow granularity. Therefore, the SMF allocates an IP address and a port number to the link status detection function based on the QoS flow granularity. In other words, each QoS flow corresponds to one IP address and one port number.

If the IP address and the port number are not carried in step 806, the UPF allocates the IP address and the port number to the link status detection function based on a local policy.

Step 808: The UPF sends a session request/update response to the SMF. Correspondingly, the SMF receives the session request/update response.

If the IP address and the port number are not carried in step 806, in step 807, the UPF allocates the IP address and the port number to the link status detection function based on a local policy. In this case, the session request/update response in step 808 may carry the IP address and the port number that are allocated by the UP based on the local policy.

Step 809: The SMF sends an N2 message to the RAN, where the N2 message carries a PDU session identifier and a PDU session establishment/update success message. Correspondingly, the RAN receives the N2 message.

The PDU session establishment/update success message carries the link status detection indication and the QFI.

Optionally, the PDU session establishment/update success message further includes the link status detection frequency or the link status detection cycle at the QoS flow granularity. For a detailed description, refer to the description of step 806. Details are not described herein again.

Optionally, the PDU session establishment/update success message further includes the link status reporting indication, the link status reporting frequency, or the link status reporting cycle at the QoS flow granularity. For a detailed description, refer to the description of step 806. Details are not described herein again.

Optionally, the N2 message further includes the IP address and the port number of the link status detection function, and the QFI. The QFI has a correspondence with the IP address and the port number.

Because link status detection at the QoS flow granularity is performed, the PDU session establishment/update success message may further carry the SDF description information (or an SDF template) and a counting indication. The counting indication indicates the UE to count a quantity of service data packets sent by the UE to the UPF on the link; the counting indication indicates the UE to count a quantity of service data packets sent by the UPF to the UE on the link; the counting indication indicates the UE to stop counting, when receiving link status detection information, a quantity of service data packets received on the link, reset a counter, and store or send the quantity of the service data packets received on the link to the UPF; or the counting indication indicates the UE to calculate, when receiving link status detection information, a quantity of service data packets received on the link, and store or send the quantity of the service data packets received on the link to the UPF.

In addition, the PDU session establishment/update success message may further carry PMF SDF description information (or a PMF SDF template) and packet loss rate related information, and the packet loss rate related information includes a packet loss rate detection indication. The packet loss rate detection indication indicates the UE to calculate, when receiving, from the UPF, a quantity of received service data packets that is counted by the UPF, a packet loss rate of the service data packets. Alternatively, the packet loss rate detection indication indicates the UE to calculate a packet loss rate of the service data packets when receiving link status detection information. Alternatively, the packet loss rate detection indication indicates the UE to calculate a quantity of service data packets received on the link when receiving link status detection information, and calculate the packet loss rate of the service data packets by using the quantity of the service data packets received on the link. Alternatively, the packet loss rate detection indication indicates the UE to: when receiving link status detection information, stop counting a quantity of service data packets received on the link, reset a counter, and calculate the packet loss rate of the service data packets by using the counted quantity of the service data packets received on the link.

Step 810: The RAN sends the PDU session establishment/update success message to the UE. Correspondingly, the UE receives the PDU session establishment/update success message.

Step 811: The RAN allocates a session-related resource, for example, allocates tunnel identification information (including an IP address and a tunnel endpoint identifier (TEID)) on a RAN side.

Step 812: The RAN sends the N2 message to the SMF, where the N2 message carries the tunnel identification information on the RAN side. Correspondingly, the SMF receives the N2 message.

Step 813: The SMF sends a session request/update message to the UPF, where the session request/update message carries the tunnel identification information on the RAN side. Correspondingly, the UPF receives the session request/update message.

When a session request message is sent, the session request message may be, for example, a PFCP session request message. When a session update message is sent, the session update message may be, for example, a PFCP session update message.

Because link status detection at the QoS flow granularity is performed, the session request/update message may further carry the SDF description information (or an SDF template) and a counting indication. The counting indication indicates the UPF to count a quantity of service data packets sent by the UPF to the UE on the link; the counting indication indicates the UPF to count a quantity of service data packets sent by the UE to the UPF on the link; the counting indication indicates the UPF to stop counting, when receiving link status detection information, a quantity of service data packets received on the link, reset a counter, and store or send the quantity of the service data packets received on the link to the UE; or the counting indication indicates the UPF to calculate, when receiving link status detection information, a quantity of service data packets received on the link, and store or send the quantity of the service data packets received on the link to the UE.

In addition, the session request/update message may further carry PMF SDF description information (or a PMF SDF template) and packet loss rate related information, and the packet loss rate related information includes a packet loss rate detection indication. The packet loss rate detection indication indicates the UPF to calculate, when receiving, from the UE, a quantity of received service data packets that is counted by the UE, a packet loss rate of the service data packets. Alternatively, the packet loss rate detection indication indicates the UPF to calculate a packet loss rate of the service data packets when receiving link status detection information. Alternatively, the packet loss rate detection indication indicates the UPF to calculate a quantity of service data packets received on the link when receiving link status detection information, and calculate the packet loss rate of the service data packets by using the quantity of the service data packets received on the link. Alternatively, the packet loss rate detection indication indicates the UPF to: when receiving link status detection information, stop counting a quantity of service data packets received on the link, reset a counter, and calculate the packet loss rate of the service data packets by using the counted quantity of the service data packets received on the link.

Step 814: The UPF sends a session request/update response to the SMF. Correspondingly, the SMF receives the session request/update response.

Based on the foregoing solution, link status detection functions of the ULE and the UPF are enabled, and information related to link status detection is configured for the UE and the UPF, so that the UE and the UPF may quickly and accurately detect a packet loss rate of service data packets on a link based on the enabled link status detection functions.

Figure 9:
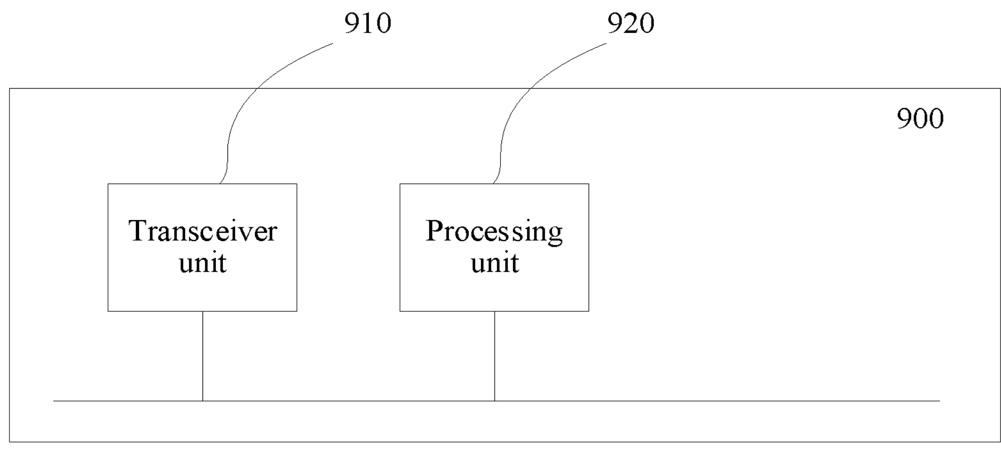
FIG. 9 is a schematic diagram of a communication apparatus according to an embodiment.

FIG. 9 is a schematic diagram of a communication apparatus according to an embodiment. The apparatus is configured to implement steps performed by the first device, the second device, or the session management network element in the foregoing embodiments. As shown in FIG. 9, the apparatus 900 includes a transceiver unit 910 and a processing unit 920.

Optionally, the communication apparatus 900 may further include a storage unit. The storage unit is configured to store data or instructions (which may also be referred to as code or a program). The foregoing units may interact with or be coupled to the storage unit, to implement a corresponding method or function. For example, the processing unit 920 may read the data or the instructions in the storage unit, so that the communication apparatus implements the methods in the foregoing embodiments.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be an independently disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using an integrated logic circuit of hardware in a processor element, or may be implemented in a form of software invoked by the processing element.

In an example, a unit in any one of the foregoing apparatuses may be one or more integrated circuits configured to implement the foregoing method, for example, one or more application-specific integrated circuits (ASICs), one or more microprocessors (e.g., digital signal processors (DSPs)), one or more field-programmable gate arrays (FPGAs), or a combination of at least two of the integrated circuit forms. For another example, when the units in the apparatus may be implemented in a form of scheduling a program by the processing element, the processing element may be a general-purpose processor, for example, a central processing unit (CPU) or another processor that can invoke the program. For still another example, the units may be integrated and implemented in a form of a system-on-a-chip (SOC).

The foregoing transceiver unit 910 is an interface circuit of the apparatus, and is configured to receive a signal from another apparatus or send a signal to another apparatus. For example, when the apparatus is implemented in a form of a chip, the transceiver unit 910 is an interface circuit of the chip that is configured to receive a signal from another chip or apparatus, or an interface circuit configured to send a signal to another chip or apparatus.

Figure 10:
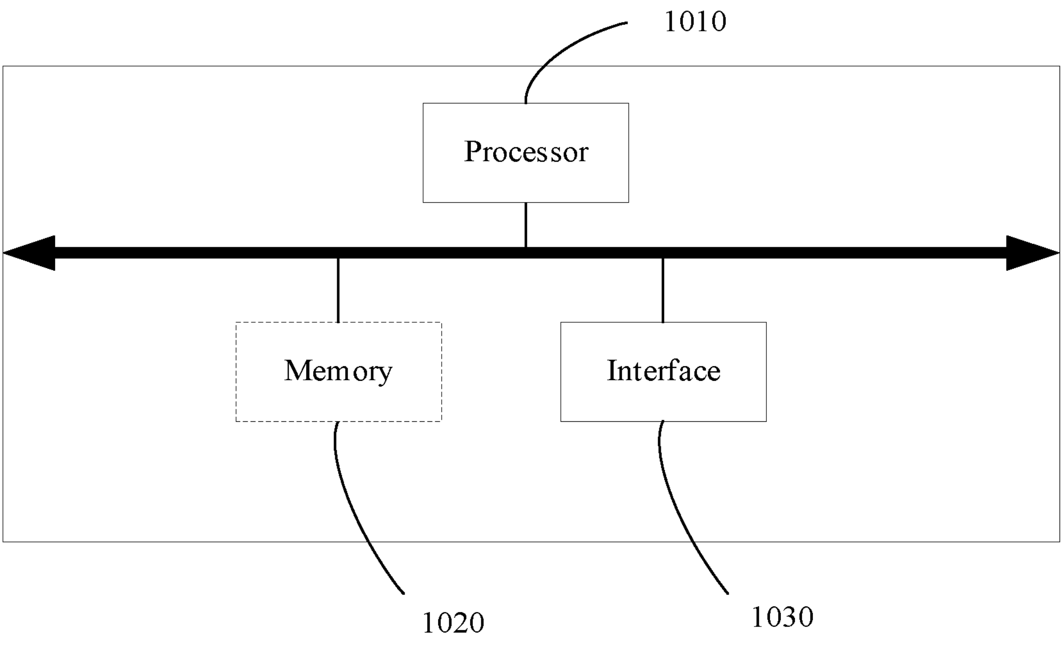
FIG. 10 is a schematic diagram of a communication apparatus according to an embodiment.

FIG. 10 is a schematic diagram of a communication apparatus according to an embodiment. The communication apparatus is configured to implement operations of the first device, the second device, or the session management network element in the foregoing embodiments. As shown in FIG. 10, the communication apparatus includes a processor 1010 and an interface 1030. Optionally, the communication apparatus further includes a memory 1020. The interface 1030 is configured to communicate with another device.

The method performed by the first device, the second device, or the session management network element in the foregoing embodiments may be implemented by the processor 1010 by invoking a program stored in a memory (which may be the memory 1020 in the first device, the second device, or the session management network element, or may be an external memory). That is, the first device, the second device, or the session management network element may include the processor 1010. The processor 1010 invokes the program in the memory, to perform the method performed by the first device, the second device, or the session management network element in the foregoing method embodiments. The processor herein may be an integrated circuit having a signal processing capability, for example, a CPU. The first device, the second device, or the session management network element may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

Specifically, functions/implementation processes of the transceiver unit 910 and the processing unit 920 in FIG. 9 may be implemented by the processor 1010 in the communication apparatus 1000 shown in FIG. 10 by invoking computer-executable instructions stored in the memory 1020. Alternatively, a function/implementation process of the processing unit 920 in FIG. 9 may be implemented by the processor 1010 in the communication apparatus 1000 shown in FIG. 10 by invoking computer-executable instructions stored in the memory 1020, and a function/implementation process of the transceiver unit 910 in FIG. 9 may be implemented by the interface 1030 in the communication apparatus 1000 shown in FIG. 10.

A person of ordinary skill in the art may understand that various numbers such as first and second are merely used for differentiation for ease of description, and are not used to limit the scope of embodiments or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. "A plurality of" means two or more, and another quantifier is similar to this.

It should be understood that sequence numbers of the foregoing processes do not mean an execution sequence in various embodiments. The execution sequence of the processes should be determined based on functions and internal logic of the processes, and should not be construed as any limitation on the implementation processes of embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by using software, hardware, firmware, or any combination thereof. When software is used to implement the foregoing embodiments, all or a part of the embodiments may be implemented in a form of a computer program product. The computer program product includes one or more computer instructions. When the computer program instructions are loaded and executed on a computer, the procedures or functions according to embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state drive (SSD)).

The various illustrative logical units and circuits in embodiments may implement or operate the described functions by using a design of a general-purpose processor, a digital signal processor, an ASIC, an FPGA, or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments may be directly embedded into hardware, a software unit executed by a processor, or a combination thereof. The software unit may be stored in a random-access memory (RAM), a flash memory, a read-only memory (ROM), an erasable programmable ROM (EPROM), an electrically erasable programmable ROM (EEPROM), a register, a hard disk, a removable magnetic disk, a CD-ROM, or a storage medium in any other form in the art. For example, the storage medium may be connected to a processor, so that the processor may read information from the storage medium and write information to the storage medium. Alternatively, the storage medium may be integrated into a processor. The processor and the storage medium may be disposed in an ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In one or more example designs, the functions described may be implemented by using hardware, software, firmware, or any combination thereof. If the functions are implemented by software, the functions may be stored in a computer-readable medium or are transmitted to a computer-readable medium in a form of one or more instructions or code. The computer-readable medium includes a computer storage medium and a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be configured to bear or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a DSL or in a wireless manner, such as infrared, radio, or microwave, the software is included in the defined computer-readable medium. The disk and the disc include a compact disc, a laser disc, an optical disc, a DVD, a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and beneficial effects are further described in detail. It should be understood that the foregoing descriptions are merely specific implementations, but are not intended to limit the protection scope of this disclosure. Any modification, equivalent replacement, improvement, or the like made based on the technical solutions shall fall within the protection scope of this disclosure. According to the foregoing descriptions of this specification, technologies in the art may use or implement the content of this disclosure. Any modification based on the disclosed content shall be considered obvious in the art. The basic principles described in this disclosure may be applied to other variations without departing from the essence and scope of this disclosure. Therefore, the content disclosed in this disclosure is not limited to the described embodiments and designs but may also be extended to a maximum scope that is consistent with the principles and disclosed new features of this disclosure.

Although this disclosure is described with reference to specific features and embodiments thereof, it is clear that various modifications and combinations may be made to this disclosure without departing from the spirit and scope of this disclosure. Correspondingly, the specification and accompanying drawings are merely example descriptions defined by the appended claims, and are considered as any or all of modifications, variations, combinations or equivalents that cover the scope of this disclosure. A person skilled in the art may make various modifications and variations without departing from the scope of this disclosure. In this way, this disclosure is intended to cover these modifications and variations provided that these modifications and variations fall within the scope of the claims and equivalent technologies thereof.

What is claimed is:

1. A method implemented by a session management network element and comprising:

making a determination that link status detection per quality of service (QoS) flow is applied for a multi-access protocol data unit (PDU) session, wherein the multi-access PDU session supports a service that simultaneously uses a 3rd Generation Partnership Project (3GPP) access and a non-3GPP access; and sending, to a first device and in response to the determination, a QoS flow identifier (QFI), a first port number associated with the 3GPP access, and a second port number associated with the non-3GPP access, wherein the QFI indicates a QoS flow on which the link status detection is performed, wherein the first port number is for the link status detection on the 3GPP access, and wherein the second port number is for the link status detection on the non-3GPP access.

2. The method of claim 1, further comprising sending, to a second device, a counting indication instructing the second device to count a quantity of service data packets from the first device to the second device on a link or instructing the second device to both calculate, when receiving link status detection information, the quantity and send the quantity.

3. The method of claim 2, wherein the second device is a user plane network element.

4. The method of claim 1, further comprising sending, to a second device, a packet loss rate detection indication instructing the second device to calculate a packet loss rate of service data packets when receiving link status detection information or instructing the second device to both calculate, when receiving the link status detection information, a quantity of the service data packets received on a link and calculate the packet loss rate using the quantity.

5. The method of claim 1, further comprising sending, to the first device, a counting indication instructing the first device to count a quantity of service data packets from the first device to a second device on a link.

6. The method of claim 1, further comprising sending, to the first device, a packet loss rate detection indication instructing the first device to calculate, when receiving from a second device service data packets that are counted by the second device, a packet loss rate of the service data packets.

7. The method of claim 1, further comprising sending, to the first device or a second device, a link status reporting indication instructing reporting of a packet loss rate of service data packets, a link status reporting frequency instructing a frequency of reporting the packet loss rate, or a link status reporting cycle instructing a cycle of reporting the packet loss rate.

8. The method of claim 1, further comprising further making the determination when a steering function of the QoS flow is access traffic steering, switching, and splitting lower layer (ATSSS-LL), when the steering function is the ATSSS-LL and a steering mode of the QoS flow is a load-balancing mode, a smallest delay mode, a priority-based mode, or an active-standby mode, or when receiving a link status threshold of the QoS flow from a policy control network element, wherein the link status threshold comprises a packet loss rate threshold.

9. The method of claim 1, further comprising further sending, to a terminal device or a chip in response to the determination, the QFI, the first port number, and the second port number.

10. A session management network element comprising:
a memory configured to store computer instructions; and
one or more processors coupled to the memory and configured to execute the computer instructions to cause the session management network element to:
make a determination that link status detection per quality of service (QoS) flow is applied for a multi-access protocol data unit (PDU) session, wherein the multi-access PDU session supports a service that simultaneously uses a 3rd Generation Partnership Project (3GPP) access and a non-3GPP access; and
send, to a first device and in response to the determination, a QoS flow identifier (QFI), a first port number associated with the 3GPP access, and a second port number associated with the non-3GPP access,
wherein the QFI indicates a QoS flow on which the link status detection is performed,
wherein the first port number is for the link status detection on the 3GPP access, and
wherein the second port number is for the link status detection on the non-3GPP access.

11. The session management network element of claim 10, wherein the one or more processors are further configured to execute the computer instructions to send, to a second device, a counting indication instructing the second device to count a quantity of service data packets from the first device to the second device on a link or instructing the second device to both calculate, when receiving link status detection information, the quantity and send the quantity.

12. The session management network element of claim 11, wherein the second device is a user plane network element.

13. The session management network element of claim 10, wherein the one or more processors are further configured to execute the computer instructions to send, to a second device, a packet loss rate detection indication instructing the second device to calculate a packet loss rate of service data packets when receiving link status detection information or instructing the second device to both calculate, when receiving the link status detection information, a quantity of the service data packets received on a link and calculate the packet loss rate using the quantity.

14. The session management network element of claim 10, wherein the one or more processors are further configured to execute the computer instructions to send, to the first device, a counting indication instructing the first device to count a quantity of service data packets from the first device to a second device on a link.

15. The session management network element of claim 10, wherein the one or more processors are further configured to execute the computer instructions to send, to the first device, a packet loss rate detection indication instructing the first device to calculate, when receiving from a second device service data packets that are counted by the second device, a packet loss rate of the service data packets.

16. The session management network element of claim 10, wherein the one or more processors are further configured to execute the computer instructions to send, to the first device or a second device, a link status reporting indication instructing reporting of a packet loss rate of service data packets, a link status reporting frequency instructing a frequency of reporting the packet loss rate, or a link status reporting cycle instructing a cycle of reporting the packet loss rate.

17. The session management network element of claim 10, wherein the one or more processors are further configured to execute the computer instructions to further make the determination when a steering function of the QoS flow is access traffic steering, switching, and splitting lower layer (ATSSS-LL), when the steering function is the ATSSS-LL and a steering mode of the QoS flow is a load-balancing mode, a smallest delay mode, a priority-based mode, or an active-standby mode, or when receiving a link status threshold of the QoS flow from a policy control network element, wherein the link status threshold comprises a packet loss rate threshold.

18. The session management network element of claim 10, wherein the one or more processors are further configured to execute the computer instructions to further send, to a terminal device in response to the determination, the QFI, the first port number, and the second port number.

19. A method comprising:
receiving a quality of service (QoS) flow identifier (QFI), a first port number associated with a 3rd Generation Partnership Project (3GPP) access, and a second port number associated with a non-3GPP access, wherein the QFI indicates a QoS flow on which link status detection is performed, wherein the first port number is for the link status detection on the 3GPP access, and wherein the second port number is for the link status detection on the non-3GPP access; and
performing, the link status detection based on the QFI and based on the first port number or the second port number.

20. An apparatus, comprising:
a memory configured to store computer instructions; and
one or more processors coupled to the memory and configured to execute the computer instructions to:
receive a quality of service (QoS) flow identifier (QFI), a first port number associated with a 3rd Generation Partnership Project (3GPP) access, and a second port number associated with a non-3GPP access, wherein the QFI indicates a QoS flow on which link status detection is performed, wherein the first port number is for the link status detection on the 3GPP access, and wherein the second port number is for the link status detection on the non-3GPP access; and
perform the link status detection based on the QFI and based on the first port number or the second port number.

* * * * *